US012655608B2

(12) United States Patent
Johnson et al.

(10) Patent No.: US 12,655,608 B2
(45) Date of Patent: Jun. 16, 2026

(54) INDUSTRIAL MACHINE REMOTE OPERATION SYSTEMS, AND ASSOCIATED DEVICES AND METHODS

(71) Applicant: Caterpillar Inc., Peoria, IL (US)

(72) Inventors: Terril J. Johnson, Washington, IL (US); Christian D. Ritchie, Morton, IL (US); Brad R. Van De Veer, Washington, IL (US); Rajasurendiran Muthu, Tamil Nadu (IN)

(73) Assignee: Caterpillar Inc., Peoria, IL (US)

( * ) Notice: Subject to any disclaimer, the term of this patent is extended or adjusted under 35 U.S.C. 154(b) by 306 days.

(21) Appl. No.: 17/863,296

(22) Filed: Jul. 12, 2022

(65) Prior Publication Data

US 2024/0018746 A1     Jan. 18, 2024

(51) Int. Cl.
E02F 9/20     (2006.01)
E02F 3/84     (2006.01)
E02F 9/26     (2006.01)
G05D 1/224     (2024.01)

(52) U.S. Cl.
CPC .............. E02F 9/205 (2013.01); E02F 3/841 (2013.01); E02F 9/265 (2013.01); G05D 1/2247 (2024.01)

(58) Field of Classification Search
CPC ....... E02F 3/841; E02F 9/2004; E02F 9/2008; E02F 9/205; G05G 7/10; B60R 1/27; B60R 2300/305; G05D 1/0038; G05D 1/0044; G05D 1/2247; G05D 1/2249
See application file for complete search history.

(56) References Cited

U.S. PATENT DOCUMENTS

| | | | |
|---|---|---|---|
| 4,855,822 A | 8/1989 | Narendra et al. | |
| 5,887,365 A * | 3/1999 | Fujishima | E02F 9/226 |
| | | | 700/59 |
| 8,139,108 B2 | 3/2012 | Stratton et al. | |
| 9,206,589 B2 | 12/2015 | Price | |
| 9,228,321 B1 | 1/2016 | Stratton et al. | |

(Continued)

FOREIGN PATENT DOCUMENTS

| | | | |
|---|---|---|---|
| CN | 212256563 U | 12/2020 | |
| DE | 202004000145 U1 * | 5/2004 | A01B 3/111 |

(Continued)

OTHER PUBLICATIONS

EPO machine translation of JP 2023-043540 A (original JP document published Mar. 29, 2023) (Year: 2023).*

(Continued)

*Primary Examiner* — David A Testardi

(57)     ABSTRACT

The present technology is directed generally to industrial machine remote operation systems, devices, and methods. In some embodiments, an industrial machine remote operation system configured in accordance with embodiments of the present technology includes a control interface including one or more elements associated with remote operation of an industrial machine. In at least some embodiments, the control interface can include one or more indicators associated with motion and/or an orientation of the machine. Additionally, or alternatively, the control interface can include one or more indicators associated with motion and/or orientation of a component of the machine, such as a machine work tool.

20 Claims, 16 Drawing Sheets

(56) References Cited

U.S. PATENT DOCUMENTS

| | | | |
|---|---|---|---|
| 10,829,910 B2 | 11/2020 | Yoshinada et al. | |
| 2008/0180523 A1* | 7/2008 | Stratton | G09B 9/048 348/114 |
| 2009/0177337 A1* | 7/2009 | Yuet | G05D 1/0044 701/2 |
| 2010/0249957 A1* | 9/2010 | Price | G08C 17/02 700/83 |
| 2010/0299031 A1* | 11/2010 | Zhdanov | E02F 3/845 701/50 |
| 2012/0154572 A1* | 6/2012 | Stratton | G09B 9/048 348/114 |
| 2014/0100712 A1* | 4/2014 | Nomura | E02F 9/264 701/1 |
| 2014/0100744 A1* | 4/2014 | Johnson | E02F 3/3677 701/50 |
| 2014/0176709 A1* | 6/2014 | Redenbo | G05D 1/0038 348/143 |
| 2014/0188333 A1* | 7/2014 | Friend | E02F 9/261 701/34.4 |
| 2014/0214240 A1* | 7/2014 | Funke | G05D 1/0291 701/2 |
| 2015/0029017 A1* | 1/2015 | Thoreson | B60K 35/00 340/461 |
| 2015/0375680 A1* | 12/2015 | Watanabe | G06T 3/60 701/36 |
| 2016/0222602 A1* | 8/2016 | Downing | E01C 19/48 |
| 2017/0050566 A1* | 2/2017 | Yamashita | H04N 5/265 |
| 2017/0254050 A1* | 9/2017 | Wright | E02F 9/261 |
| 2017/0284069 A1* | 10/2017 | Machida | B60R 1/27 |
| 2017/0298595 A1* | 10/2017 | Machida | H04N 23/90 |
| 2017/0335548 A1* | 11/2017 | Noda | E02F 3/7609 |
| 2018/0051446 A1* | 2/2018 | Yoshinada | E02F 9/264 |
| 2018/0313062 A1* | 11/2018 | Tsukamoto | E02F 9/20 |
| 2018/0313063 A1* | 11/2018 | Elkins | E02F 3/401 |
| 2018/0320340 A1* | 11/2018 | Evans | G05D 1/0044 |
| 2019/0218744 A1* | 7/2019 | Izumikawa | E02F 3/425 |
| 2019/0227543 A1* | 7/2019 | Choe | G05D 1/0038 |
| 2019/0339701 A1* | 11/2019 | Pedersen | G05D 1/0044 |
| 2020/0018049 A1* | 1/2020 | Takahama | E02F 9/2025 |
| 2020/0020093 A1* | 1/2020 | Frei | G05D 1/0246 |
| 2020/0125114 A1* | 4/2020 | Minagawa | G05D 1/0282 |
| 2020/0231210 A1* | 7/2020 | Anderson | G05D 1/024 |
| 2020/0240110 A1* | 7/2020 | Takahama | E02F 9/205 |
| 2020/0269877 A1* | 8/2020 | Mortazavi | G08G 1/0129 |
| 2020/0310416 A1* | 10/2020 | Matsunaga | G06F 3/147 |
| 2021/0043085 A1* | 2/2021 | Kreiling | E02F 3/96 |
| 2021/0054597 A1* | 2/2021 | Ueda | E02F 9/205 |
| 2021/0071394 A1* | 3/2021 | Kean | G05D 1/0219 |
| 2021/0072764 A1* | 3/2021 | Kean | E02F 9/205 |
| 2021/0127550 A1* | 5/2021 | Ohrstrom | A01B 69/006 |
| 2021/0246635 A1* | 8/2021 | Tsukamoto | E02F 9/261 |
| 2021/0250561 A1* | 8/2021 | Takahama | H04N 9/3135 |
| 2021/0381203 A1* | 12/2021 | Itoh | H04N 7/181 |
| 2021/0388580 A1* | 12/2021 | Nakazawa | E02F 9/261 |
| 2021/0404151 A1* | 12/2021 | Nakazawa | E02F 9/264 |
| 2022/0042278 A1* | 2/2022 | Currier | E02F 9/26 |
| 2022/0136214 A1* | 5/2022 | Hurd | B60K 35/80 701/32.4 |
| 2022/0136215 A1* | 5/2022 | Shiratani | B66C 13/46 701/50 |
| 2022/0155453 A1* | 5/2022 | Takahama | G01S 17/86 |
| 2022/0178114 A1* | 6/2022 | Takahama | G01C 15/00 |
| 2022/0228341 A1* | 7/2022 | Skillsäter | E02F 3/431 |
| 2022/0282451 A1* | 9/2022 | Ready-Campbell | G05D 1/0238 |
| 2022/0316188 A1* | 10/2022 | Takahama | E02F 3/841 |
| 2022/0317685 A1* | 10/2022 | Watanabe | G05D 1/0022 |
| 2023/0001854 A1* | 1/2023 | Bruflodt | B60R 1/23 |
| 2023/0082603 A1* | 3/2023 | Akatsuka | B60K 35/00 345/632 |
| 2023/0267895 A1* | 8/2023 | Ibusuki | H04N 7/18 345/581 |
| 2023/0291989 A1* | 9/2023 | Ding | G06T 7/0004 |
| 2023/0340757 A1* | 10/2023 | Tagalpallewar | B60K 35/60 |
| 2023/0417023 A1* | 12/2023 | Itoh | E02F 9/20 |
| 2024/0035257 A1* | 2/2024 | Umeda | E02F 9/205 |
| 2024/0319734 A1* | 9/2024 | Gustavsson | G05D 1/2247 |
| 2025/0019938 A1* | 1/2025 | Yoshihara | E02F 3/435 |

FOREIGN PATENT DOCUMENTS

| | | | | |
|---|---|---|---|---|
| EP | 3926107 A1 * | 12/2021 | | E02F 9/205 |
| FR | 3033053 A1 * | 8/2016 | | |
| JP | 2001132021 A * | 5/2001 | | |
| JP | 2010061346 A * | 3/2010 | | |
| JP | 2013113044 A * | 6/2013 | | |
| JP | 2020002718 A | 1/2020 | | |
| JP | 2020120232 A | 8/2020 | | |
| JP | 2023043540 A * | 3/2023 | | B60K 35/00 |
| KR | 1020180107653 A | 10/2018 | | |
| KR | 1020210140737 A | 11/2021 | | |
| KR | 1020220035091 A | 3/2022 | | |

OTHER PUBLICATIONS

Wikipedia article, "Color scheme", Old revision dated Mar. 24, 2022, 9 pages. (Year: 2022).*

Written Opinion and International Search Report for Int'l. Patent Appln. No. PCT/US2023/068855, mailed Oct. 17, 2023 (10 pgs).

* cited by examiner

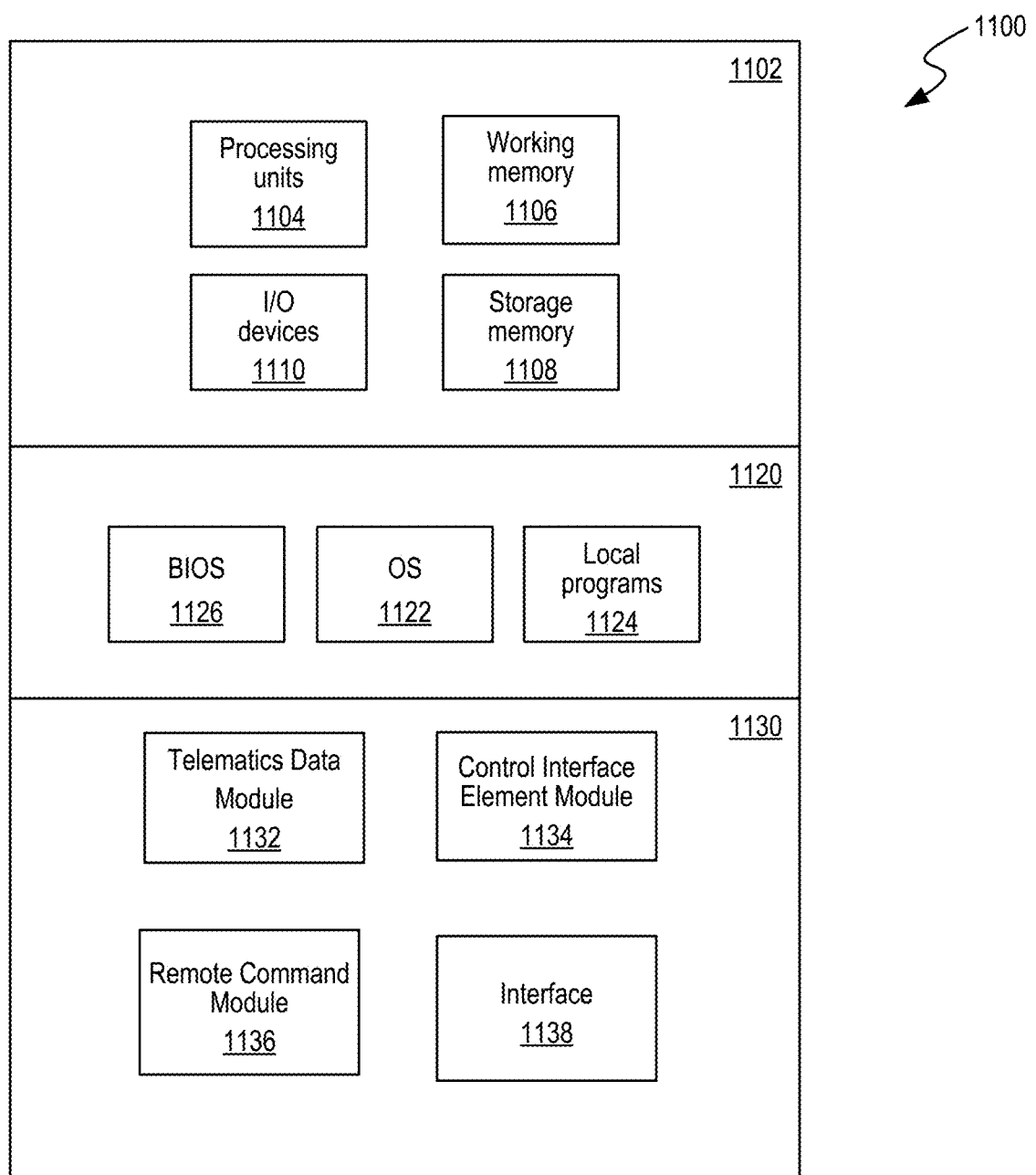
_1100_
_1102_
Processing units
_1104_
Working memory
_1106_
I/O devices
_1110_
Storage memory
_1108_
_1120_
BIOS
_1126_
OS
_1122_
Local programs
_1124_
_1130_
Telematics Data Module
_1132_
Control Interface Element Module
_1134_
Remote Command Module
_1136_
Interface
_1138_
_FIG. 11_

INDUSTRIAL MACHINE REMOTE OPERATION SYSTEMS, AND ASSOCIATED DEVICES AND METHODS

TECHNICAL FIELD

The present technology is directed to devices, systems, and methods for remote operation of industrial machines.

BACKGROUND

Remote operators, such as remote operators who remotely operate industrial machines based on real time video feeds, can face many difficulties not present when operating these machines in person. For example, in-person operators can directly feel changes in a machine's orientation, whereas remote operators often rely on an instrument panel to relay this information. As such, remote operators may lack or have a reduced sense of the machine's orientation relative to the machine's surrounding environment. Additionally, the video feeds that some remote operators use to remotely operate machines may not adequately convey a sense of the machine's depth or relative position to the remote operator, which can reduce the remote operator's awareness of the machine's position relative to the surrounding environment.

Current remote operation methods do not adequately address these problems. For example, U.S. Pat. No. 4,855,822 to Narendra, et al., ("the '822 patent") allegedly describes "[m]ethods and apparatus . . . for driving a vehicle from a remote control station achieving tele-operation of the vehicle." (Id., at Abstract). However, the methods and apparatus described in the '822 patent are described narrowly in the context of use in "a hostile environment such as a battlefield." (Id., at [col. 4, ll. 50-51]). Additionally, the '822 patent describes that "a specific object of the invention [is] to provide a highly optimized data compression system which makes possible narrow bandwidth television image data transmission while at the same time providing a high resolution video display of instantaneous position information for an operator of a robotic vehicle," (Id., at [col. 4, ll. 30-35]), and does not teach or suggest a method or apparatus for improving a remote operator's sense of a machine's orientation relative to the machine's surrounding environment and/or improving the remote operator's awareness of the machine's position relative to the surrounding environment.

SUMMARY

In some embodiments, the present technology can include a method of improving an operator's operating environment awareness while remotely operating an industrial machine. The method can include at least one of (i) displaying, via a display screen of a remote operating system, a video feed from a camera of the industrial machine; (ii) receiving, at a first time and via the remote operating system, first telematics data associated with remote operation of the industrial machine; (iii) generating, based at least partially on the first telematics data, an industrial machine control interface, wherein generating the industrial machine control interface includes displaying the industrial machine control interface on the display screen over the video feed and aligned with at least a portion of the industrial machine; (iv) receiving, at a second time and via the remote operating system, second telematics data associated with remote operation of the industrial machine; and (v) updating the industrial machine control interface based at least partially on the second telematics data, wherein updating the industrial machine control interface includes maintaining the alignment of the industrial machine control interface with the portion of the industrial machine.

Additionally, or alternatively, the present technology can include a system for improving an operator's operating environment awareness while remotely operating an industrial machine. The system can include a remote operating system including a display screen; one or more processors; and one or more memory devices. The one or more memory devices can store instructions that, when executed by the one or more processors, cause the one or more processors to: (i) display, via the display screen, a video feed from a camera of the industrial machine; (ii) receive, at a first time and via the remote operating system, first telematics data associated with remote operation of the industrial machine; (iii) generate, based at least partially on the first telematics data, an industrial machine control interface, wherein generating the industrial machine control interface includes displaying the industrial machine control interface on the display screen over the video feed, aligned with at least a portion of the industrial machine; (iv) receive, at a second time and via the remote operating system, second telematics data associated with remote operation of the industrial machine; and/or (v) update the industrial machine control interface based at least partially on the second telematics data, wherein updating the industrial machine control interface includes maintaining the alignment of the industrial machine control interface with the portion of the industrial machine.

In these and other embodiments, the present technology can include one or more non-transitory computer-readable media storing computer-executable instructions. When executed by one or more processors, the instructions can cause the one or more processors to perform operations, comprising at least one of (i) displaying, via a display screen of a remote operating system, a video feed from a camera of an industrial machine; (ii) receiving, at a first time and via the remote operating system, first telematics data associated with remote operation of the industrial machine; (iii) generating, based at least partially on the first telematics data, an industrial machine control interface, wherein generating the industrial machine control interface includes displaying the industrial machine control interface on the display screen over the video feed, aligned with at least a portion of the industrial machine; (iv) receiving, at a second time and via the remote operating system, second telematics data associated with remote operation of the industrial machine; and (v) updating the industrial machine control interface based at least partially on the second telematics data, wherein updating the industrial machine control interface includes maintaining the alignment of the industrial machine control interface with the portion of the industrial machine.

Other aspects of the present technology will appear hereinafter. The features described herein can be used separately or together, or in various combinations of one or more of them.

BRIEF DESCRIPTION OF THE DRAWINGS

FIG. 11 is a block diagram illustrating elements which can be used in a machine remote operation system, in accordance with embodiments of the present technology.

DETAILED DESCRIPTION

The present technology is directed generally to industrial machine remote operation systems and associated devices and methods. In some embodiments, an industrial machine remote operation system configured in accordance with embodiments of the present technology includes a control interface, including one or more elements associated with remote operation of an industrial machine. In at least some embodiments, the control interface can include one or more indicators associated with motion or movement of the machine (e.g., in the forward and/or backward directions). Additionally, or alternatively, the control interface can include one or more indicators associated with an orientation of the machine (e.g., the roll, pitch, and/or yaw of the machine). In these and other embodiments, the control interface can include one or more indicators associated with motion or movement of at least one of the machine's components. In at least some embodiments, for example, the component can include a work tool of the machine. Accordingly, the control interface can include one or more indicators associated with the movement of the work tool, for example, the height of the work tool and/or the position of the work tool relative to the ground.

Additionally, or alternatively, the control interface can include one or more indicators associated with the orientation of the work tool, for example, the pitch, roll or tilt, and/or yaw of the work tool. Any of the indicators can be generated based on data (e.g., telematics data) collected from one or more sensors associated with the machine and/or the component(s) thereof and can be displayed to a remote operator along with one or more video feeds from camera(s) mounted to the industrial machine. In at least some embodiments, one or more of the indicators can correspond to one or more components of the machine and be associated with one or more indicators, and individual ones of the indicators can be aligned with the associated component when displayed on the video feed. In some aspects, industrial machine remote operation systems configured in accordance with embodiments of the present technology are expected to increase the precision, accuracy, and/or safety with which a remote operator can remotely operate a machine. In at least some embodiments, for example, the control interface and/or elements thereof described herein are expected to increase the remote operator's awareness of the machine orientation and surrounding environment.

A person skilled in the art will understand (i) that the technology may have additional embodiments than those illustrated and described herein with reference to FIGS. 1-11, and (ii) that the technology may be practiced without several of the details of the embodiments described herein with reference to FIGS. 1-11.

A. SELECTED EMBODIMENTS OF INDUSTRIAL MACHINE REMOTE OPERATION SYSTEMS, AND ASSOCIATED DEVICES AND METHODS

Figure 1:
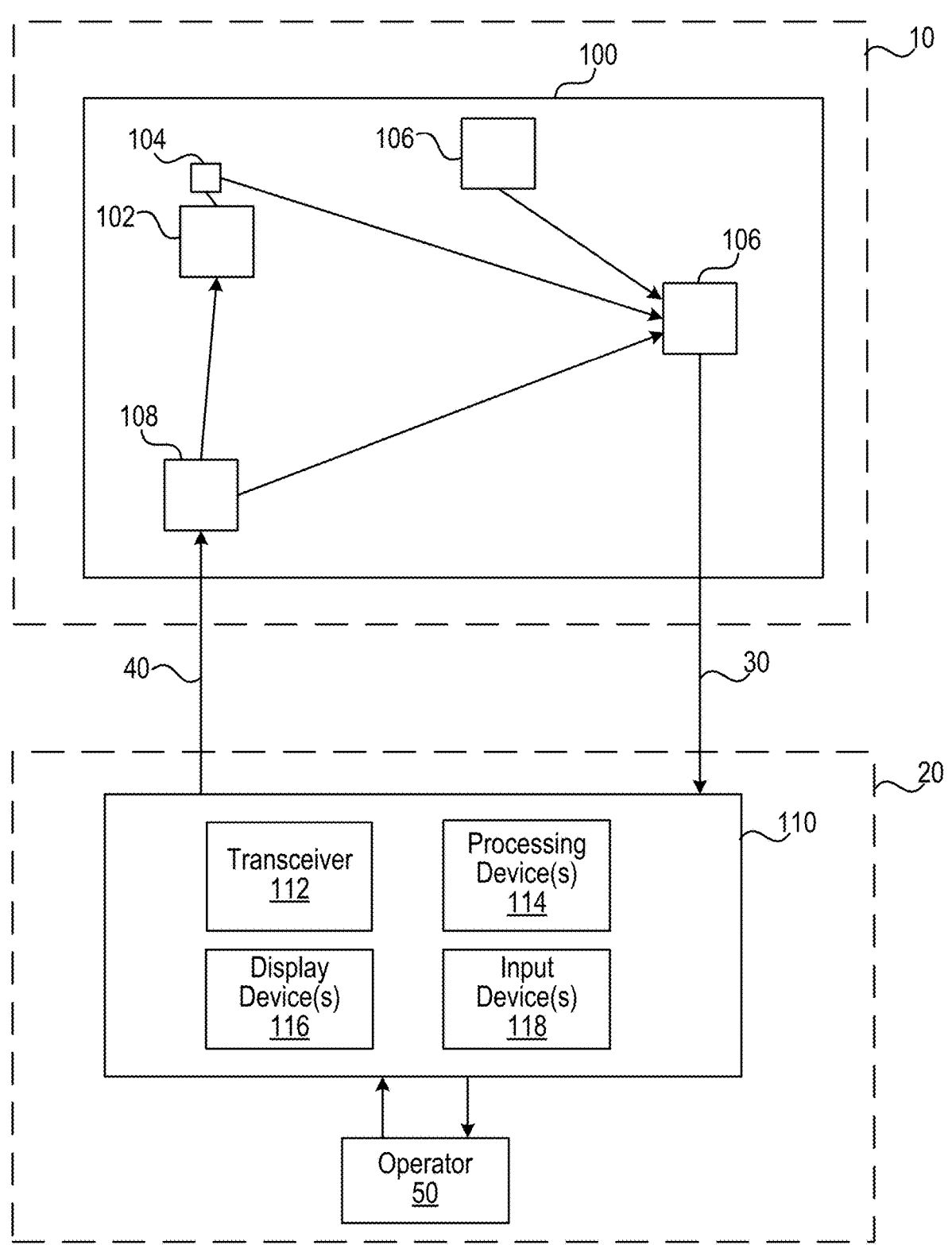
FIG. 1 is a schematic illustration of a machine and a remote control station, each configured in accordance with embodiments of the present technology.

FIG. 1 is a schematic illustration of a machine 100 and a remote control station 110 ("remote control system 110," "remote operator station 110," "remote operation device 110," and the like) configured in accordance with embodiments of the present technology. The machine 100 can be operably associated (e.g., paired) with the remote control station, such that an operator 50 (e.g., a remote operator, a human operator, and the like) of the remote control station 110 can remotely operate the machine 100 via the remote control station 110. In the illustrated embodiment, for example, the machine 100 is in a first operating environment 10, and the remote control station 110 and the operator 50 are in a second operating environment 20, remote and/or otherwise different from the first operating environment 10.

The machine 100 can be a truck, a tracked-type tractor, an excavator, a wheel loader, a front-end loader, a motor grader, a vehicle, an industrial machine, and/or any other suitable machine. The machine 100 includes one or more components 102, one or more sensors, one or more cameras, a transceiver 106, and a controller 108. Each of the components 102 can operate/function independently and/or together to perform activities associated with the machine 100. The components 102 can include one or more work tools, drive components (e.g., tires, wheels, treads, tracks, and the like), engines, transmissions, powertrains, actuators (e.g., hydraulic actuators, mechanical actuators, solenoids, and the like), batteries or battery arrays, aftertreatment systems, one or more input devices (such as steering components), hydraulic systems, and/or any other suitable components. Each of the sensors 104 can be connected to (e.g., operably and/or communicatively coupled to) and/or otherwise arranged to detect data, such as telematics data, associated with one or more of the components 102 and/or the machine 100, for example, to monitor the operation (e.g., the position, orientation, movement, motion, and the like) of the components 102 and/or the machine 100. Individual ones of the sensors 104 can include a position sensor, a temperature sensor, a pressure sensor, an accelerometer, a voltameter, a strain gauge, a machine payload sensor, and/or any other suitable sensor. The sensors 104 may include, or may be connected (e.g., operably, communicatively, etc.), to a machine transceiver 106. The machine transceiver 106 is configured to transmit data and/or video 30 detected by the sensors 104 and/or the cameras to the remote control station 110. The machine controller 108 can be in communication with the remote control station 110 and operably coupled to one or more of the components 102, such that the machine controller 108 can receive one or more command signals 40 from the remote control system 110 (e.g., to remotely operate the machine 100).

The remote control station 110 can include a transceiver 112, one or more processing devices 114, one or more display devices 116, and one or more input devices 118. The transceiver 112 can be in communication with the machine 100 (e.g., the machine transceiver 106 and/or the machine controller 108), such that the transceiver 112 can receive the data 30 from the machine transceiver 106 and/or transmit command signals 40 to the machine controller 108. Individual ones of the processing devices 114 can process the data 30 received from the machine 100 and/or otherwise perform functions associated with the operation of the remote control station 110. The display devices 116 can display (e.g., to the operator 50) video data 30 received from one or more of the cameras. Individual ones of the display devices 116 can include an LCD display, an OLED display, a mini LED display, a VR headset, a computer display, a mobile phone display, and/or any other suitable display device. The input devices 118 can correspond to the components 102, and can each receive inputs from the operator 50 while the operator 50 remotely controls the machine 100. Individual ones of the input devices 118 can include a joystick, a keyboard, a mouse, a touchscreen, a steering wheel, one or more pedals, one or more levers, one or more switches, one or more buttons, and/or any other suitable input devices. The remote control station 110 and the environment in which it can operate are described in greater detail below regarding FIGS. 9-11.

Although described with reference to a single machine (the machine 100) in FIG. 1, in other embodiments, the present technology can include more machines. In at least some embodiments, for example, the present technology can include at least two, three, four, five, six, seven, eight, nine, ten, or more machines, each of which can be configured generally similar to, the same as, or different than the machine 100 (e.g., including component(s) 102, sensor(s) 104, and/or camera(s)).

Figure 2A:
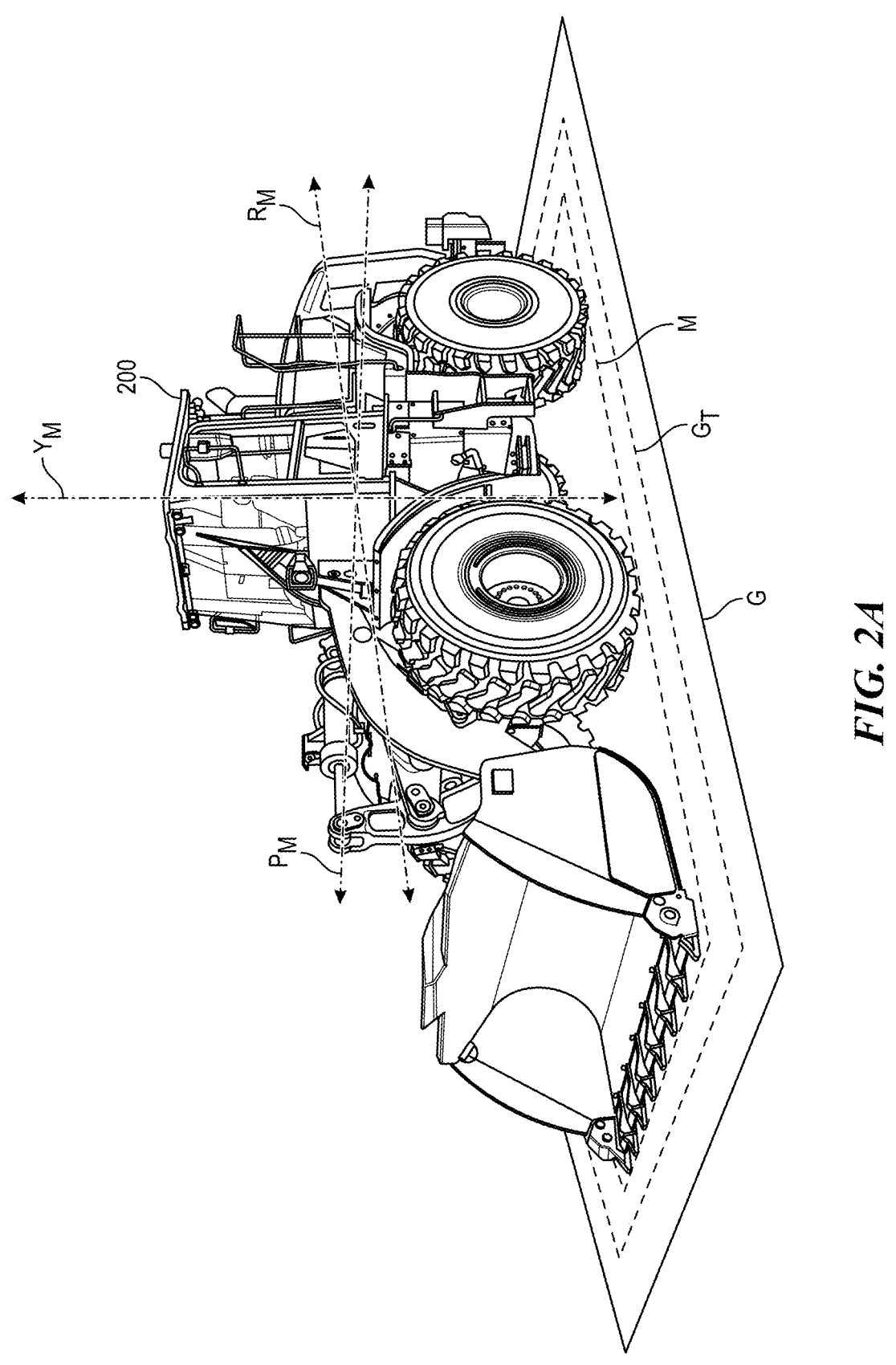
FIGS. 2A-2C are perspective views of a machine configured in accordance with embodiments of the present technology.
Figure 2B:
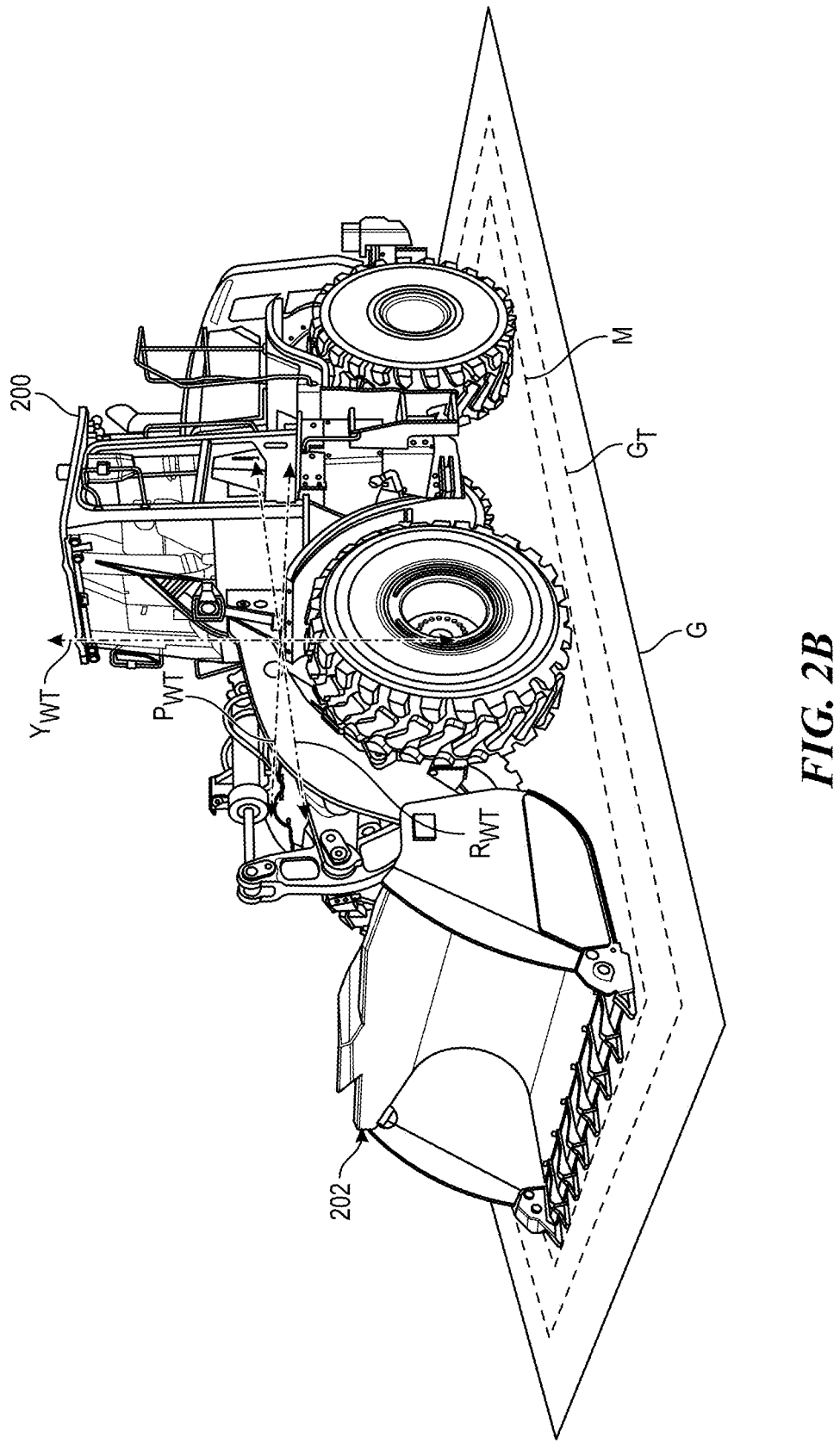
Figure 2C:
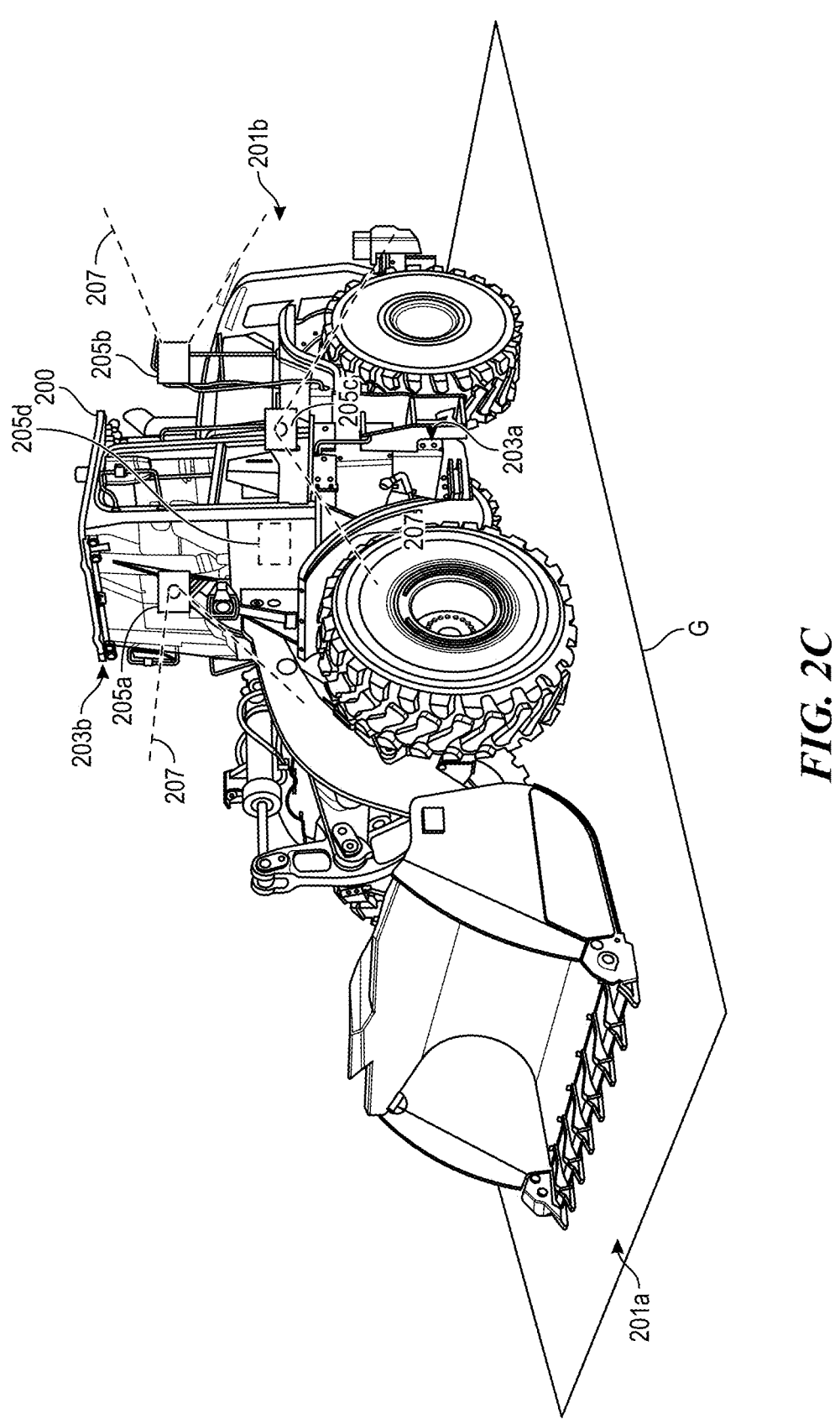

FIGS. 2A-2C are perspective views of a machine 200 configured in accordance with embodiments of the present technology. The machine 200 can include some features that are at least generally similar or identical in structure and/or function to the corresponding features of the machine 100 described above with reference to FIG. 1. Additionally, although in FIGS. 2A-2C the machine 200 is illustrated as a front loader, in other embodiments the machine 200 can be any other suitable type of machine, including any of the machines/industrial machines described above with reference to FIG. 1. Referring to FIG. 2A, the machine 200 can define a machine or chassis plane M (shown in dashed line), for example, in which the machine 200 (e.g., one or more of the machine's tires, as shown in FIG. 2A) contact the surrounding ground G. Accordingly, the machine plane M is expected to remain at least generally or fully aligned (e.g., coplanar) with the ground G during operation.

Additionally, the machine 200 can include one or more machine axes. Each of the axes can be used to define a position, rotation, orientation, and/or motion of the machine relative to a true ground plane $G_T$ (shown in dashed line). The machine axes can include a machine roll axis $R_M$, a machine yaw axis $Y_M$, and/or a machine pitch axis $P_M$. The true ground plane $G_T$ can represent generally or substantially level ground. Accordingly, the machine plane M and/or the ground G can be generally or substantially parallel/coplanar to the true ground plane $G_T$ when the ground G is level, and the machine plane M and/or the ground G can be angled relative to the true ground plane $G_T$ when the ground G is sloped (e.g., inclined, uneven, not level, and the like). In other embodiments, the ground G can represent graded or sloped ground, and/or have any other suitable orientation. In operation, the machine 200 and/or at least a portion thereof can (i) be rolled (e.g., left or right) relative to the true ground plane $G_T$ about the machine roll axis $R_M$, (ii) be rotated or pitched (e.g., up or down) relative to the true ground plane $G_T$ about the machine pitch axis $P_M$, and/or (iii) be rotated or yawed (e.g., left or right) relative to the true ground plane $G_T$ about the machine yaw axis $Y_M$.

Referring to FIG. 2B, in the illustrated embodiment, the machine 200 includes a work tool 202 (e.g., a component of the machine 200). The work tool 202 can include one or more work tool axes, individual ones of which can be at least generally similar or identical to the machine axes described in detail above regarding FIG. 2A. The work tool axes can include a work tool roll or tilt axis RWT, a work tool yaw axis YWT, and/or a work tool pitch axis PWT. Each of the work tool axes can be used to define a position, rotation, orientation, and/or motion of the work tool 202 and/or one or more portions thereof relative to the ground G and/or the machine 200. In operation, the work tool 202 and/or at least a portion thereof can (i) be rolled/tilted (e.g., left or right) relative to the true ground plane GT and/or the machine 200 about the work tool roll axis RWT, (ii) be rotated or pitched (e.g., up or down) relative to the true ground plane GT and/or the machine 200 about the work tool pitch axis PWT, and/or (iii) be rotated or yawed (e.g., left or right) relative to the true ground plane GT and/or the machine 200 about the work tool yaw axis YWT.

Referring to FIG. 2C, one or more cameras 205a-d can be coupled to the machine 200. Individual ones of the cameras 205a-d can have a field of view 207 and be positioned such that one or more sides of the machine 200 and/or at least part of the machine's surrounding environment (e.g., the ground G and/or object(s) positioned thereon) are within the field of view 207, such that individual ones of the cameras 205a-d can be used by a remote operator to remotely operate the machine 200. In the illustrated embodiment, for example, the machine 200 includes (i) a first (e.g., front-facing) camera 205a positioned to image at least part of a first (e.g., front) side 201a of the machine 200 and a corresponding first portion of the machine's environment, (ii) a second (e.g., back or rear-facing) camera 205b positioned to image at least part of a second (e.g., back or rear) side 201b opposite the first side 201a and a corresponding second portion of the machine's environment, (iii) a third (e.g., left-facing) camera 205c positioned to image at least part of a third (e.g., left) side 203a of the machine 200 between the first side 201a and the second side 201b and a corresponding third portion of the machine's environment, and a fourth (e.g., right-facing) camera 205d positioned to image at least part of a fourth (e.g., right) side 203b of the machine 200 opposite the third side 203a and a corresponding fourth portion of the machine's environment. In other embodiments, more or fewer cameras 205a-d can be coupled to the machine 200, and/or individual ones of the cameras 205a-d can be positioned to image these and any other suitable side(s) of the machine and/or portion(s) of the machine's environment.

Figure 3A:
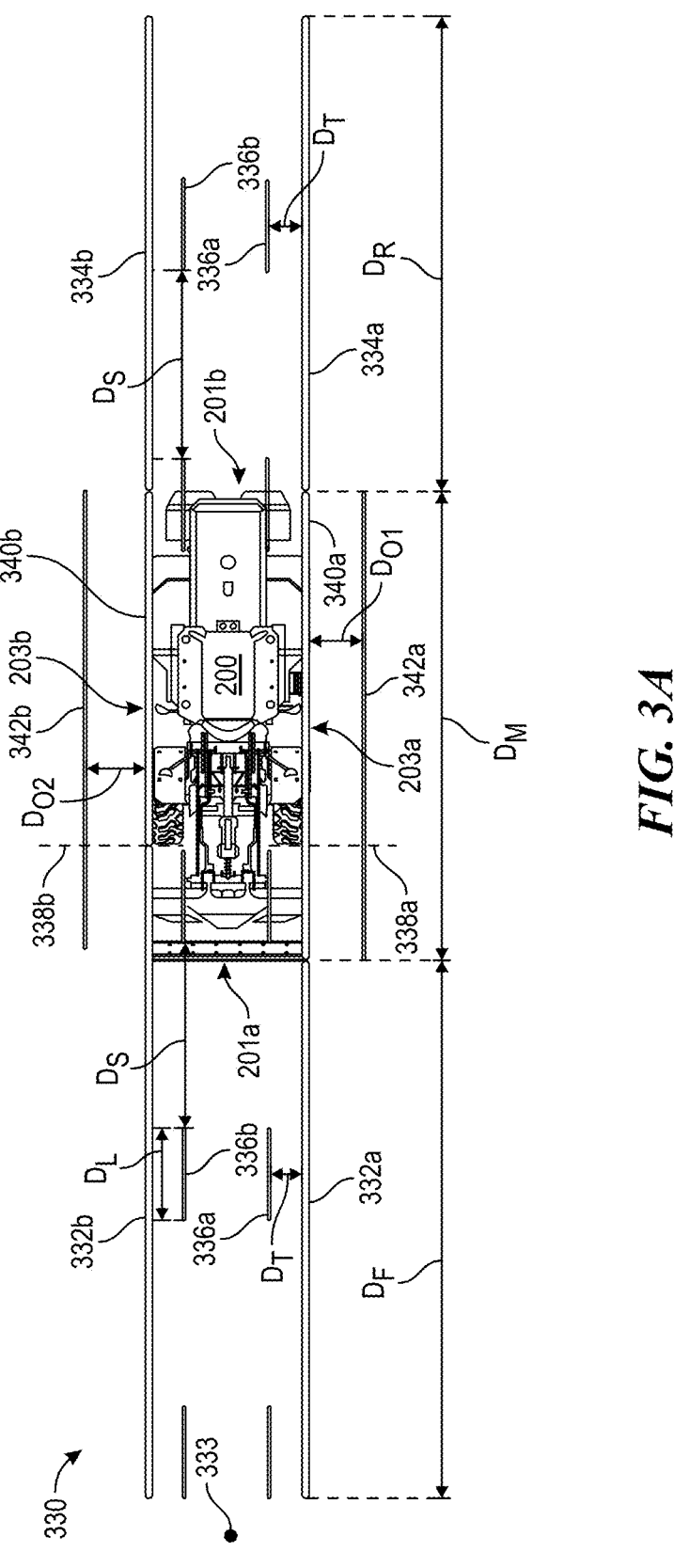
FIGS. 3A to 3C, 4, 5, 6A, 6B, and 7 illustrate various machine control interface elements in accordance with embodiments of the present technology.

FIGS. 3A-7 illustrate various industrial machine control interface elements 330 ("control interface 330," "machine control interface 330," "industrial machine control interface 330," "indicators 330," and the like) in accordance with embodiments of the present technology. Referring to FIGS. 3A-3C, the machine 200 and the control interface 330 are shown in top view for the sake of clarity. In practice, however, it will be appreciated the control interface 330 can be shown on/over a video feed obtained from a camera positioned to image a side (e.g., the first side 201a, the second side 201b, the third side 203a, the fourth side 203b, etc.) of the machine 200 (e.g., as described above regarding FIG. 2C). For example, when viewed on a display, the control interface 330 can be at least partially aligned with one or more of the machine's sides, components, and/or one or more portions thereof. Additionally, or alternatively, when viewed on a display, the control interface 330 can be positioned/aligned as described below, but as projections onto the machine plane M and/or the ground G (FIG. 2A). As described in detail below, projecting elements of the control interface 330 onto the machine plane M and/or the ground G (FIG. 2A) is expected to better indicate to a remote operator the position, orientation, and/or motion of the machine and its components relative to the machine's surrounding environment, which can improve the remote operator's awareness of the machine's position relative to the environment (e.g., the ground G; FIGS. 2A-2C) around the machine, and may increase the precision, accuracy, and/or safety with which a remote operator can remotely operate a machine. Furthermore, the control interface 330 described herein can be generated, updated, and/or otherwise determined based on data (e.g., telematics data) associated with the machine and/or the machine's components and obtained from sensors, such as the sensors 104 described previously. Moreover, one or more of the different features of the control interface 330 of the present technology can be combined together and/or omitted.

Referring to FIG. 3A, the control interface 330 can include one or more machine forward path indicators 332, one or more machine reverse path indicators 334, one or more drive component path indicators 336, one or more machine drive component indicators 338, one or more machine side reference indicators 340, and/or one or more machine side offset indicators 342. In the illustrated embodiment, each of the above-mentioned indicators include a first (e.g., left side) element, indicated by the letter "a" (e.g., first/left machine forward path indicator 332a) and a second (e.g., right side) element, indicated by the letter "b" (e.g., second/right machine forward path indicator 332b). As described in greater detail below regarding FIG. 3B, the control interface 330 can be dynamic. For example, individual elements of the control interface 330 can be rotated, angled, curved, or otherwise updated in real time based on movement and/or reorientation of the machine 200.

The machine forward path indicators 332a-b can extend a distance DF outwardly/forwardly from the front 201a of the machine 200. The distance DF can be any suitable distance, and can be determined by an operator of the machine 200 and/or automatically based at least partially on the machine's forward travel speed, as described in greater detail regarding FIG. 3C. Optionally, as shown in the illustrated embodiment, the left and/or right machine forward path indicators 332a-b can extend at least partially between the front 201a of the machine 200 and the machine drive component indicators 338. Each of the forward machine path indicators 332a-b can be aligned with a corresponding outer edge of one of the drive components of the machine 200. In the illustrated embodiment, for example, the left machine forward path indicator 332a is aligned with a left outer edge of a left front tire of the machine 200 and the right machine forward path indicator 332b is aligned with a right outer edge of a right front tire of the machine 200. Accordingly, each of the machine forward path indicators 332a-b can be associated with or represent a forward travel path of the machine 200, such that the machine 200 can travel generally or substantially along the machine forward path indicators 332a-b when the operator causes the machine 200 to move forward.

The machine reverse path indicators 334a-b can extend a distance DR outwardly/backwardly from the back 201b of the machine 200. The distance DR can be any suitable distance, and can be determined by an operator of the machine 200 and/or automatically based at least partially on the machine's forward travel speed, as described in greater detail regarding FIG. 3B. Each of the reverse machine path indicators 334a-b can be aligned with a corresponding outer edge of one of the drive components of the machine 200. In the illustrated embodiment, for example, the left machine reverse path indicator 334a is aligned with a left outer edge of a left rear tire of the machine 200 and the right machine reverse path indicator 334b is aligned with a right outer edge of a right rear tire of the machine 200. Accordingly, each of the machine reverse path indicators 334a-b can be associated with or represent a reverse travel path of the machine 200, such that the machine 200 can travel generally or substantially along the machine reverse path indicators 334a-b when the operator causes the machine 200 to move in reverse.

Figure 3B:
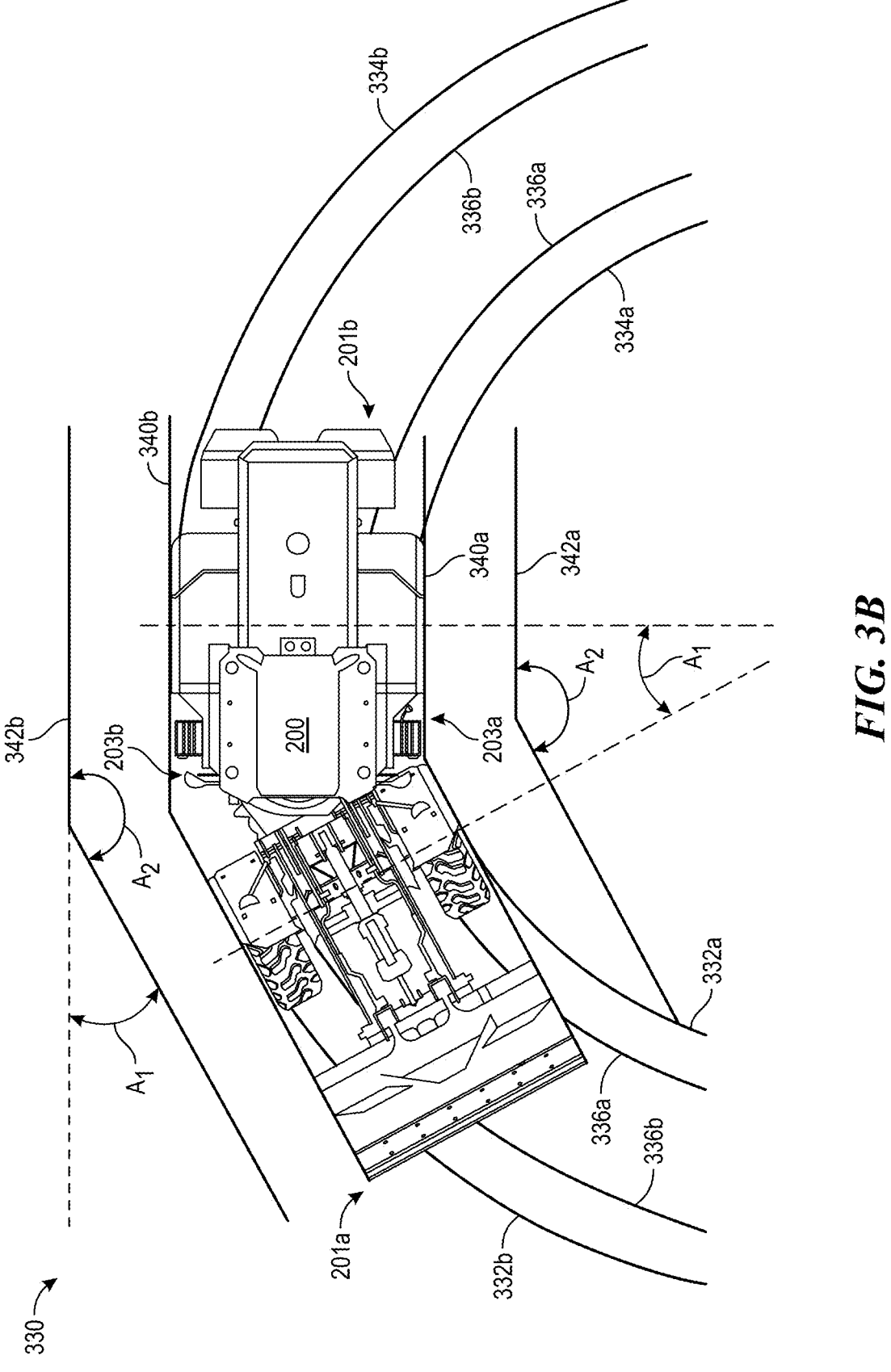

The drive component path indicators 336a-b can extend in one or both of the machine's directions of travel (e.g., forwardly and/or backwardly). Each of the drive component path indicators 336a-b can at least generally parallel or be parallel to, and/or positioned a distance $D_T$ inwardly from, the corresponding machine forward and/or reverse path indicators 332, 334. In the illustrated embodiment, for example, the left drive component path indicators 336a are positioned the distance $D_T$ inwardly from the left machine forward path indicator 332a and the left machine reverse path indicator 334a, and the right drive component path indicators 336b are positioned the distance $D_T$ inwardly from the right machine forward path indicator 332b and the right machine reverse path indicator 334b. The distance $D_T$ can be at least generally similar or identical to a width of the associated drive component (e.g., a tire of the machine 200). In the illustrated embodiment, the drive component path indicators 336a-b include a plurality of line segments, each having a length $D_L$ and a spacing $D_S$. The length $D_L$ can be at least generally similar or identical to a length of the associated drive component. The spacing $D_S$ can be at least generally similar or identical to a circumference/perimeter of the associated drive component minus the length $D_L$, for example, such that the spacing $D_S$ can correspond to a distance traveled by the machine during one complete rotation of the associate drive component In other embodiments, one or more of the drive component path indicators 336a-b can include a line extending continuously from the front 201a and/or the back 201b of the machine 200, such as shown in FIG. 3B, or have any other suitable appearance.

The drive component leading edge indicators 338a-b can be at least partially aligned with (e.g., parallel to, coplanar with, and/or the like) a leading edge of the corresponding drive component. In the illustrated embodiment, for example, the left drive component leading edge indicator 338a is coplanar with the leading edge of the front left tire, and the right drive component leading edge indicator 338b is coplanar with the leading edge of the front left tire.

The machine side reference indicators 340a-b can be at least generally aligned (e.g., colinear) with a corresponding side of the machine 200. In the illustrated embodiment, for example, the machine left side reference indicator 340a is colinear with the left side 203a of the machine 200, and the machine right side reference indicator 340b is colinear with the right side 203b of the machine 200.

The machine side offset indicators 342a-b can be at least generally parallel or parallel to the corresponding machine side reference indicators 340a-b and the corresponding side of the machine 200. In the illustrated embodiment, for example, the machine left side offset indicator 342a is parallel to the machine left side reference indicator 340a and the left side 203a of the machine 200, and the machine right side offset indicator 342b is parallel to the machine right side reference indicator 340b and the right side 203b of the machine 200. Additionally, each of the machine side offset indicators 342*a*-*b* can be spaced apart (e.g., offset) from the corresponding machine side reference indicator 340*a*-*b*. In the illustrated embodiment, for example, the machine left side offset indicator 342*a* is a distance $D_{O1}$ from the machine left side reference indicator 340*a*, and the machine right side offset indicator 342*b* is a distance $D_{O2}$ from the machine right side reference indicator 340*b*. The distances $D_{O1}$, $D_{O2}$ can be the same or different. One or both determined by the machine's remote operator. In the illustrated embodiment, both machine side offset indicators 342*a*-*b* have a length $D_M$ at least generally equal or equal to a length of the machine 200 (e.g., between the front side 201*a* and the back side 201*b*). In other embodiments, the length $D_M$ can be greater or less than the length of the machine 200, and/or be any other suitable length.

Referring to FIG. 3B, individual elements of the control interface 330 can be dynamic. In the illustrated embodiment, for example, the front 201*a* of the machine 200 has been rotated (e.g., articulated) by a first angle A1 relative to the back 201*b* of the machine 200 (e.g., to turn the machine 200 left), and individual elements of the control interface 330 have been correspondingly rotated, angled, curved, or otherwise updated in response to the machine's articulation. More specifically, in response to the rotation of the machine 200, the machine forward path indicators 332*a*-*b*, the machine reverse path indicators 334*a*-*b*, the drive component path indicators 336*a*-*b*, the machine side reference indicators 340*a*-*b*, and the machine side offset indicators 342*a*-*b* have each been correspondingly curved or angled (e.g., to represent the curved or arcuate motion of the machine 200). For example, in response to rotation of the front 201*a* of the machine 200 by the angle $A_1$, the machine forward path indicators 332*a*-*b*, the machine reverse path indicators 334*a*-*b*, and the drive component path indicators 336*a*-*b* can each be curved about a same center of curvature as the machine 200. Additionally, or alternatively, because the rotation of the machine 200 changes the orientation of the left 203*a* and/or the right 203*b* sides of the machine 200, the machine side reference indicators 340*a*-*b* and the machine side offset indicators 342*a*-*b* can each be angled to maintain their alignment with the machine 200. In the illustrated embodiment, for example, each of the machine side reference indicators 340*a*-*b* and the machine side offset indicators 342*a*-*b* have been angled a second angle $A_2$ supplementary to the first angle $A_1$ and about a same radius of curvature as the machine 200. Although the machine 200 and elements of the control interface 330 are shown in a rotated state in FIG. 3B, it will be appreciated that individual elements of the control interface 330 can be curved/angled dynamically based on the machine's movement, for example, as the operator transitions the machine 200 between the linear state (FIG. 3A) and the rotated state (FIG. 3B).

Figure 3C:
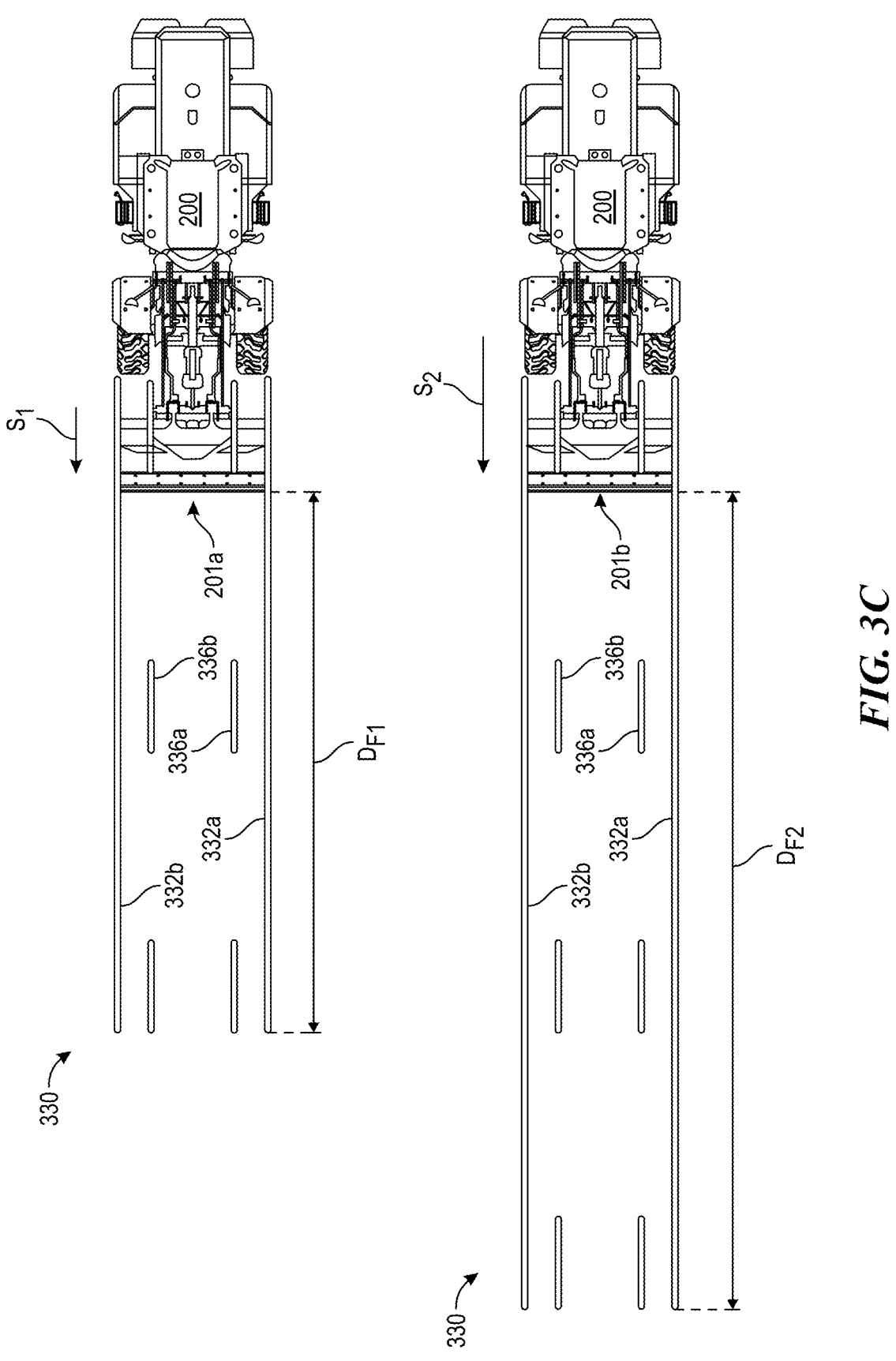

Referring to FIG. 3C, in some embodiments, the distance DF that the machine forward path indicators 332*a*-*b* extend from the front 201*a* of the machine 200 can be automatically determined based at least partially on the machine's forward travel speed. For example, when the machine 200 is traveling forward at a first speed $S_1$, the machine forward path indicators 332*a*-*b* can extend a first distance $D_{F1}$ from the front 201*a* of the machine 200, and when the machine 200 is traveling forward at a second speed $S_2$ greater than the first speed $S_1$, the machine forward path indicators 332*a*-*b* can extend a second distance $D_{F2}$ from the front 201*a* of the machine 200 and greater than the first distance $D_{F1}$. Additionally, the machine reverse path indicators 334*a*-*b* (FIGS.

3A and 3B) can also increase and/or decrease in length based on the speed at which the machine 200 travels (e.g., in reverse).

Figure 4:
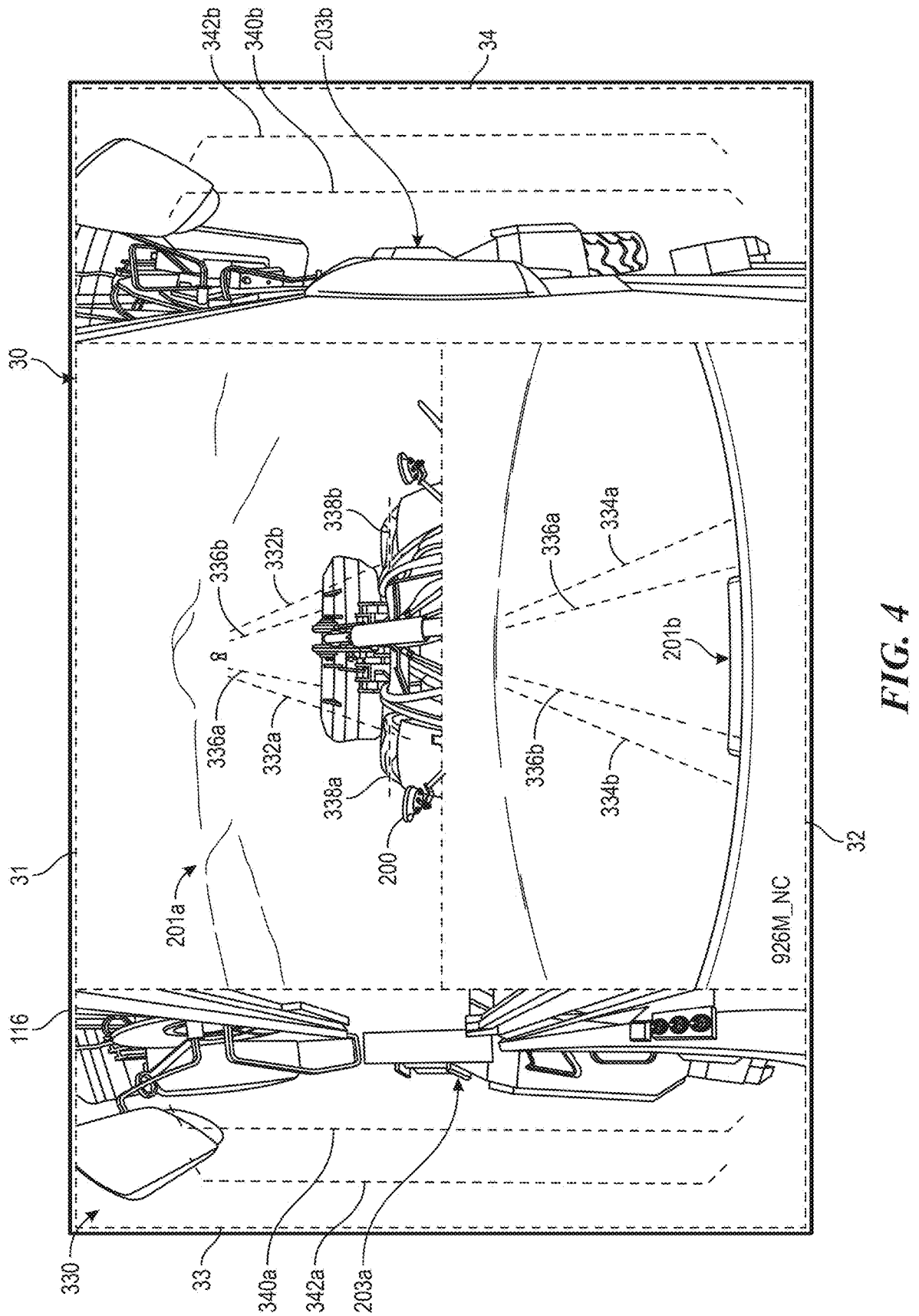

FIG. 4 illustrates one or more video feeds 30 from a machine 200 shown on the display 116 of the remote control station 110 and including the control interface 330, in accordance with embodiments of the present technology. The machine 200 and/or one or more aspects thereof can be at least generally similar or identical in structure and/or function to the machine 100 of FIG. 1 and/or the machine 200 of FIGS. 2A-3C. In the illustrated embodiment, the video feeds 30 includes (i) a first (e.g., front) video feed 31 from a camera positioned to image a first side 201*a* of the machine 200 (e.g., the first camera 205*a* of FIG. 2C), (ii) a second (e.g., rear) video feed 32 from another camera positioned to image the second side 201*b* of the machine 200 (e.g., the second camera 205*b* of FIG. 2C), (iii) a third (e.g., left side) video feed 33 from another camera positioned to image the third side 203*a* of the machine 200 (e.g., the third camera 205*c* of FIG. 2C), and (iv) a fourth (e.g., right side) video feed 34 from another camera positioned to image the fourth side 203*b* of the machine (e.g., the fourth camera 205*d* of FIG. 2C). In other embodiments, the video feeds 30 can include more or fewer video feeds, such as at least one, two, three, five, or any other suitable number of video feeds 30. Additionally, or alternatively, individual ones of the video feeds 30 can be from any suitable camera positioned to image any side(s) of the machine 200.

In the illustrated embodiment, each of the video feeds 30 include one or more of the control interface elements 330 described previously with reference to FIGS. 3A-3C. For example, (i) the first video feed 31 includes the left and right machine forward path indicators 332*a*-*b*, one or more of the left and right drive component path indicators 336*a*-*b*, and the left and right drive component leading edge indicators 338*a*-*b*; (ii) the second video feed 32 includes the left and right machine reverse path indicators 334*a*-*b* and one or more of the left and right drive component path indicators 336*a*-*b*; (iii) the third video feed 33 includes the machine left side reference indicator 340*a* and the machine left side offset indicator 342*a*; and (iv) the fourth video feed 34 includes the machine right side reference indicator 340*b* and the machine right side offset indicator 342*b*. In other embodiments, one or more of these indicators can be omitted from the respective video feed.

A remote operator (e.g., the operator 50 of FIG. 1) can view the video 30 on the display 116 of the remote control station while remotely operating the machine 200. As described above with reference to FIGS. 3A-3C, as shown on the display 116, one or more of the control interface elements 330 can be aligned with the machine 200 but shown as projections onto the machine plane M and/or the ground G (FIG. 2A). As such, individual elements of the control interface 330 may not appear to be aligned with the machine 200 in the video feeds 30. For example, in the first video feed 31, the left machine forward path indicator 332*a* is coplanar with an outer edge of the machine's 200 left front tire but shown projected onto machine plane M and/or the ground G (FIG. 2A), such that, in the plane of the display 116, the left machine forward path indicator 332*a* appears inwardly from the outer edge of the left front tire. However, aligning individual elements of the control interface 330 with the machine plane M and/or the ground G (FIG. 2A) is expected to improve the remote operator's awareness of the machine's position relative to its surrounding environment. For example, because the left machine forward path indicator 332*a* shows the remote operator at ground level, the remote operator can observe the left machine forward path indicator 332a to determine the forward path of travel of left side 203a of the machine 200, e.g., to avoid driving the machine 200 into obstacles and/or more accurately assess the machine's position relative to objects positioned to the left side 203a of the machine.

Figure 5:
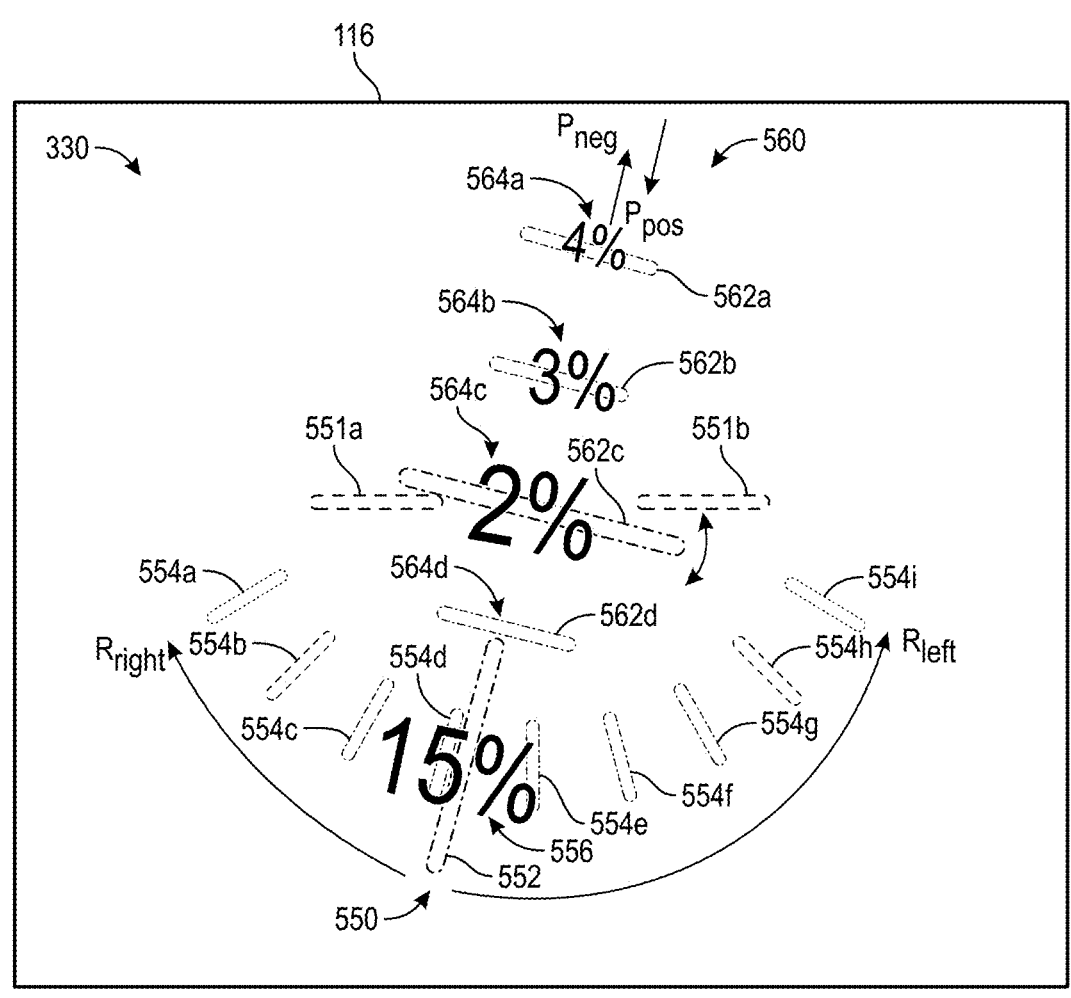

FIG. 5 illustrates machine pitch and roll indicators configured in accordance with embodiments of the present technology. The control interface 330 can further include a machine roll indicator 550, a machine pitch indicator 560, and a machine reference indicator 551a-b. In the illustrated embodiment, the machine roll indicator 550 and the machine pitch indicator 560 are centered relative to each other and the machine reference indicator 551a-b. The machine reference indicator 551a-b can include a left reference indicator 551a and a right reference indicator 551b. As described in greater detail below, the machine roll indicator 550 and the machine pitch indicator 560 can move and/or rotate relative to the machine reference indicator 551a-b, e.g., about a point centered between the left reference indicator 551a and the right reference indicator 551b.

The machine roll indicator 550 can include a current roll indicator 552 and one or more roll value indicators 554. In the illustrated embodiment, the machine roll indicator 550 includes nine roll value indicators 554a-i; in other embodiments, the machine roll indicator 550 can include more or fewer machine roll value indicators 554, such as less than nine, more than nine, or any other suitable number of roll value indicators 554. Each of the roll value indicators 554 can represent and/or otherwise be associated with a roll value of the machine. Each roll value can be determined based at least partially on and/or relative to the machine roll axis $R_M$ (FIG. 2A), and can include an angle, a percent grade, a percent rotation, a roll direction, for example, a first (e.g., left) roll direction $R_{left}$ and a second (e.g., right) roll direction $R_{right}$ opposite the first roll direction $R_{left}$, and/or any other suitable roll value.

Individual ones of the roll value indicators 554 can be associated with a roll threshold of the machine. The roll threshold can include a roll value or a range of roll values at or beyond which the machine is expected to be unstable and/or have an increased likelihood of flipping or rolling over. The roll threshold values can be machine-specific and/or determined by the remote operator. The roll value indicators 554 that correspond to roll values within or near the roll threshold value(s) can appear different than the remaining (e.g., non-threshold, safe operating range, and the like) roll value indicators 554. In the illustrated embodiment, for example, the roll value indicators 554a and 554i correspond to right and left roll value thresholds, respectively, and appear different than the non-threshold roll value indicators 554c-g. Additionally, in the illustrated embodiment, the roll value indicators 554b and 554h represent roll values near/approaching the roll value threshold 554a, 554i, and as such, the near-threshold roll value indicators 554b, 554h appear different than the threshold value indicators 554a, 554i and the non-threshold value indicators 554c-554g. In at least some embodiments, the threshold value indicators 554a-i can be differentiated by color, for example, the threshold value indicators 554a, 554i can be red, the non-threshold value indicators 554c-554g can be green, and the near-threshold roll value indicators 554b, 554h can be yellow. Additionally, or alternatively, individual ones of the threshold, near-threshold, and/or non-threshold roll value indicators can have a same or different size, transparency, brightness, a flashing or blinking effect, and/or any other suitable visual characteristic.

The current roll indicator 552 can rotate relative to the roll value indicators 554, for example, to indicate a current roll value 556 of the machine. The current roll indicator 552 can rotate in a same direction as the roll direction of the machine and/or by the current roll value 556. In the illustrated embodiment, for example, the current roll indicator 552 is rotated in the second roll direction $R_{right}$ by the current roll value 556 corresponding to a right or clockwise roll (from the remote operator's perspective) of the machine corresponding to the current roll value 556. Rotating the roll indicator in a same direction and/or by a same amount as the machine roll direction is expected to improve the remote operator's awareness of the machine's orientation relative to its surrounding environment. In some embodiments, the current roll value 556 can be displayed visually, for example, as a number. In the illustrated embodiment, for example, the current roll value 556 is superimposed over the current roll indicator 552 and configured to move/rotate with the current roll indicator 522.

In some embodiments, one or more of the roll value indicators 554 can be responsive to rotation of the current roll indicator 552. For example, if the current roll indicator 552 is at or near one of the near-threshold indicators 554b, 554h and/or the threshold indicators 554a, 554i, the corresponding indicator 554a, 554b, 554h, 554i can change visually, for example, in size, brightness, color, flashing or blinking effect, a presence, absence, or change of an outline at least partially or fully surrounding the indicator, and/or any other suitable visual characteristic. Additionally, or alternatively, the current roll indicator 552 and/or the displayed current roll value 556 can change visually when at a roll value at or near one of the near-threshold indicators 554b, 554h and/or the threshold indicators 554a, 554i.

The machine pitch indicator 560 can include one or more pitch value indicators 562, and each of the pitch value indicators 562 can correspond to a pitch value 564 of a machine. In the illustrated embodiment, the machine pitch indicator 560 includes four pitch value indicators 562a-d, each corresponding to a respective pitch value 564a-d. In other embodiments, the machine pitch indicator 560 can include more or fewer pitch value indicators 562, such as less than four, more than four, or any other suitable number of value indicators 562. In some embodiments, the individual pitch value indicators 562 can be spaced apart by a distance corresponding to their respective pitch values 564.

Each of the pitch values 564 can be determined based at least partially on and/or relative to the machine pitch axis $P_M$ (FIG. 2A), and can include an angle, a percent grade, a pitch direction, for example, a first (e.g., positive, upward) pitch $P_{pos}$ direction and a second (e.g., negative, downward) pitch $P_{neg}$ direction, and/or any other suitable pitch value. In the illustrated embodiment, for example, the first pitch value indicator 562a is associated with a first pitch value 564a, and the second pitch value indicator 562b is associated with a second pitch value 564b less than the first pitch value 564a, such that the first pitch value indicator 562a corresponds to an orientation of the machine in which the machine is pitched upwardly a greater amount than the second pitch value indicator 562b and associated orientation. In some embodiments, one or more of the pitch values 564 can be displayed visually (e.g., as a number). In the illustrated embodiment, for example, each of the pitch values 564a-c are superimposed over and configured to move with the respective pitch value indicators 562a-c.

Individual ones of the pitch value indicators 562 can be associated with a pitch threshold of the machine. The pitch threshold can include a pitch value or a range of pitch values at or beyond which the machine is expected to be unstable and/or have an increased likelihood of flipping or pitching over. The pitch threshold values can be machine-specific and/or determined by the remote operator. The pitch value indicators 562 that correspond to pitch values within or near the pitch threshold value(s) can appear different than the remaining (e.g., non-threshold, safe operating range, and the like) pitch value indicators 562, generally similar to or the same as the threshold, near-threshold, and non-threshold roll value indicators 554 described in detail above. In at least some embodiments, for example, the pitch value indicators 562 associated with the pitch threshold can be differentiated by color, size, transparency, brightness, a flashing or blinking effect, and/or any other suitable visual characteristic. In some embodiments, the visual change in the pitch value indicators 562 can be at least partially in response to proximity of a given pitch value indicator to the machine reference indicator 551*a-b*.

In operation, each of the pitch value indicators 562 can be configured to move relative to the machine reference indicator 551*a-b*, for example, to indicate the current pitch value 564 of the machine. For example, the pitch value indicators 562 can move based at least partially on the pitch direction, for example, in the first pitch direction $P_{pos}$ (e.g., downwardly, as indicated by arrow Pros) as the machine is pitched positively/upwardly, and/or the second pitch direction $P_{neg}$ (e.g., upwardly, as indicated by arrow $P_{neg}$) as the machine is pitched downwardly/negatively. In the illustrated embodiment, for example, the pitch value indicators 562 have moved such that the third pitch value indicator 564*c* is positioned between machine reference indicator 551*a-b*, and accordingly, the third pitch value 564*c* is the current pitch value of the machine. Additionally, or alternatively, each of the pitch value indicators 562 can move (e.g., scroll, translate, shift, or the like) a distance corresponding to a change in the machine's pitch. For example, the space between the individual pitch value indicator can correspond to a 1% change in the pitch of the machine, and accordingly, if the machine's pitch changes from the third pitch value 564*c* to the second pitch value 564*b*, one or more of the pitch value indicator 562*b* can shift to the machine reference indicator 551*a-b* and by a distance corresponding to the change in the machine's pitch, for example, such that the third pitch value indicator 562*b* is aligned with the machine reference indicator 551*a-b*. In these and other embodiments, each of the pitch value indicators 562 can be configured to rotate in concert with the machine roll indicator 550, for example, in one or both of the roll directions $R_{right}$, $R_{left}$. In the illustrated embodiment, for example, the current roll indicator 552 has been rotated in the second roll direction $R_{right}$ by the current roll value 556 about a point centered between the machine reference indicator 551*a-b* (as described above), and the pitch values indicators 562*a-d* have also been rotated in the second roll direction $R_{right}$ by the current roll value 556. Rotating the machine pitch indicator 560 in concert with the machine roll indicator 550 is expected to improve the remote operator's awareness of the machine's orientation relative to the machine's surrounding environment.

Figure 6A:
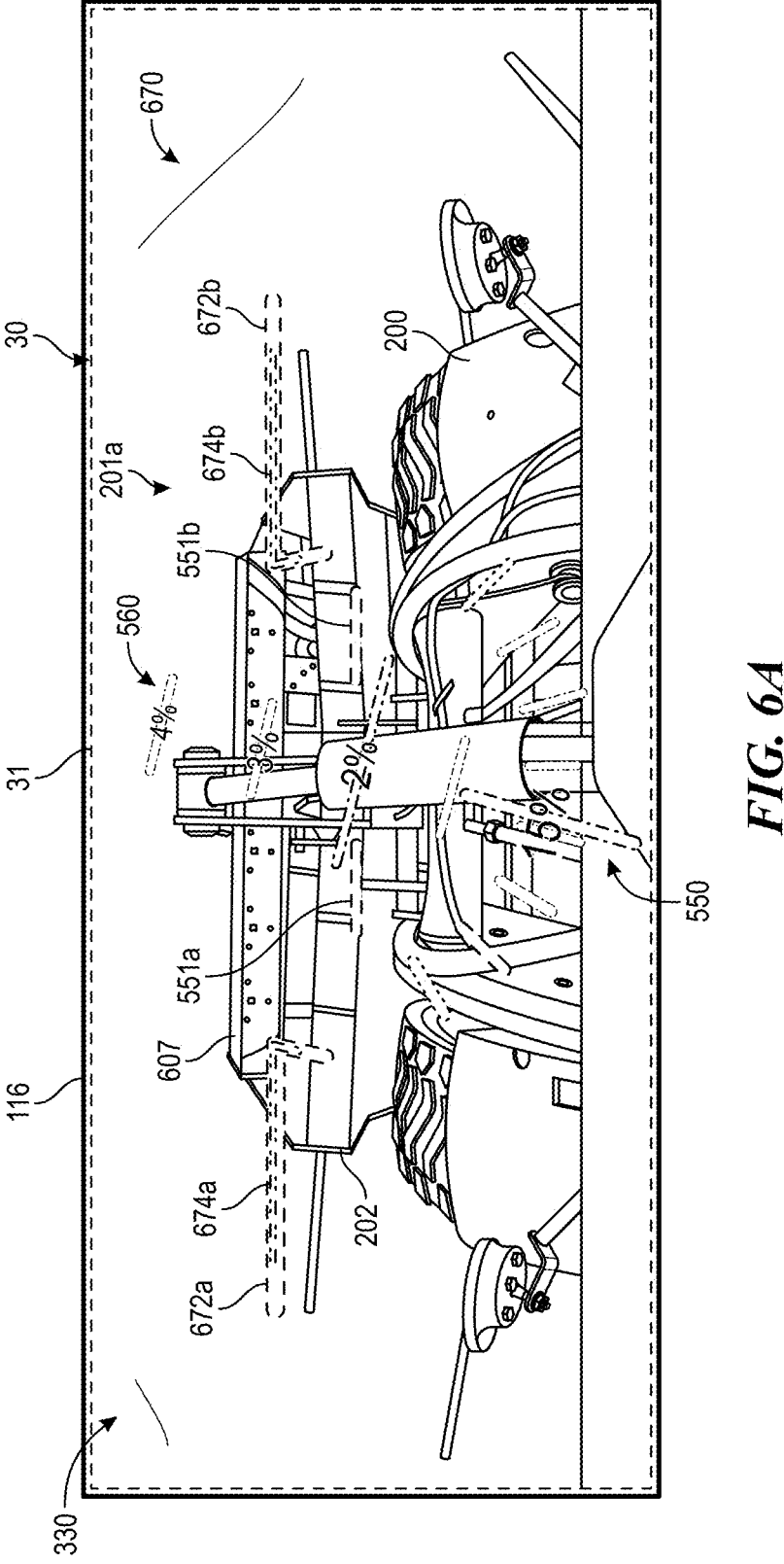

FIG. 6A illustrates the machine pitch and roll indicators of FIG. 5 and one or more work tool indicators 670 ("work tool indicator 670") in accordance with embodiments of the present technology. In the illustrated embodiment, the machine pitch indicator 560 and the machine roll indicator 550 are both positioned at or near a center of the first video feed 31 of the front side 201*a* of the machine 200. In other embodiments, the machine pitch indicator 560 and/or the machine roll indicator 550 can have any other suitable position relative to the first video feed 31 (e.g., top left corner, off-center, etc.), be positioned in any other suitable video feed of any side of the machine (e.g., the second video feed 32 of the back side 201*b* of the machine 200), and/or have any other suitable configuration.

The work tool indicator 670 can include a leading edge indicator 607, a left ground reference indicator 672*a*, a right ground reference indicator 672*b*, a left toot tool height indicator 674*a*, a right tool height indicator 674*b*. The left ground reference indicator 672*a*, right ground reference indicator 672*b*, left tool height indicator 674*a* and the right tool height indicator 674 can correspond to a position of a leading edge of the machine's work tool 202, indicated by the leading edge indicator 607. In some embodiments, the left ground reference indicator 672*a* and right ground reference indicator 672*b* can represent a projection of a current position of the leading edge onto the machine plane M and/or the ground G (FIG. 2A), for example, such that a remote operator can reference the left ground reference indicator 672*a* and right ground reference indicator 672*b* to determine the proximity of the work tool 202 to objects in front of the machine 200. In other embodiments, the left ground reference indicator 672*a* and right ground reference indicator 672*b* can represent a projection of a baseline (e.g., resting, ground, stowed, and the like) position of the leading edge on the machine plane M and/or the ground G (FIG. 2A). The left tool height indicator 674*a* and the right tool height indicator 674*b* can be aligned with (e.g., track, be colinear to, and the like) the current position of the leading edge during use of the work tool 602. Accordingly, the left tool height indicator 674*a* and the right tool height indicator 674*b* can move (e.g., vertically) relative to the left ground reference indicator 672*a* and right ground reference indicator 672*b* based at least partially on vertical movement of the leading edge, for example, such that a remote operator can reference the left tool height indicator 674*a* and the right tool height indicator 674*b* to determine a current height of the leading edge relative to left ground reference indicator 672*a* and right ground reference indicator 672*b*, as shown and described in greater detail regarding FIG. 6B.

Figure 6B:
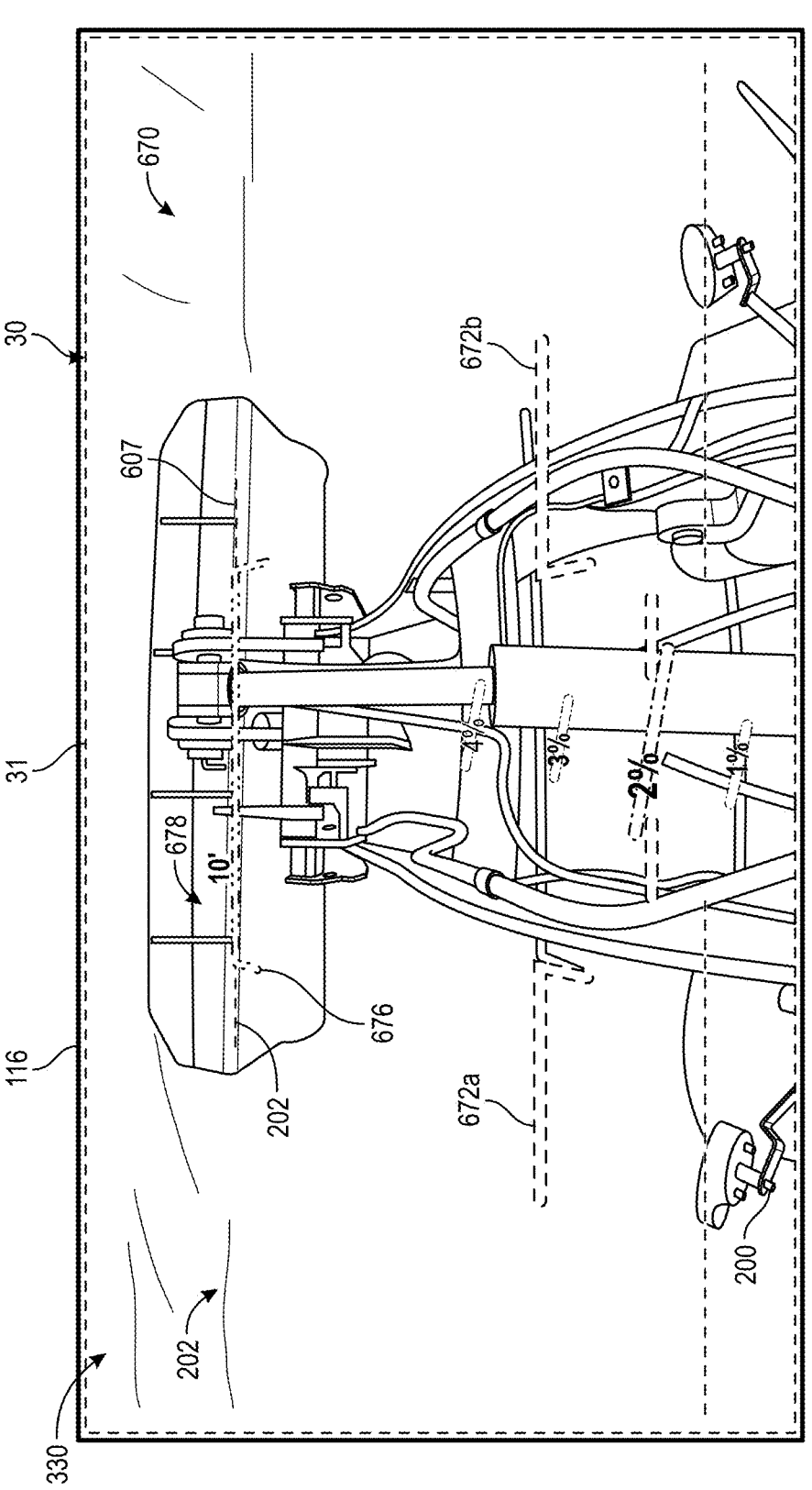

FIG. 6B illustrates the work tool indicator 670 of FIG. 6A. Referring to FIGS. 6A and 6B together, the work tool indicator 670 can change in response to movement of the work tool 202. In the illustrated embodiment, for example, the leading edge 607 (shown in dashed line as the leading edge indicator 607) of the work tool 202 has been raised and the tool height indicator 676 has been moved upwardly to track the movement of the work tool 202. Additionally, in the illustrated embodiment, the left and right tool height indicators 674*a-b* (FIG. 6A) have transitioned to a single or unitary tool height indicator 676 (FIG. 6B) in response to the movement of the leading edge. In at least some embodiments, the work tool indicator 670 can include the left and right tool height indicators 674*a-b* (FIG. 6A) when the left and right tool height indicators 674*a-b* (FIG. 6A) are at least generally or fully aligned with the corresponding left and right ground reference indicators 672*a-b*, for example, when the work tool is in the baseline, resting, ground, stowed, etc., position (FIG. 6A), and can transition to the single tool height indicator 676 (FIG. 6B) when the work tool 202 is moved or raised from the baseline position. In some aspects, changing the appearance of the work tool height indicator based on the position of the work tool is expected to improve a remote operator's awareness of the position/orientation of the work tool relative to the environment of the associated machine, for example, by indicating the relative height/alignment of the work tool's leading edge relative to the ground.

In some embodiments, a tool height value 678 corresponding to the current height of the work tool 202 can be displayed in addition to or in lieu of the tool height indicator 674, 676. In the illustrated embodiment, for example, the tool height value 678 is displayed proximate a left end of the tool height indicator 676. In other embodiments, the tool height value 678 can have another suitable position on the display 116.

Figure 7:
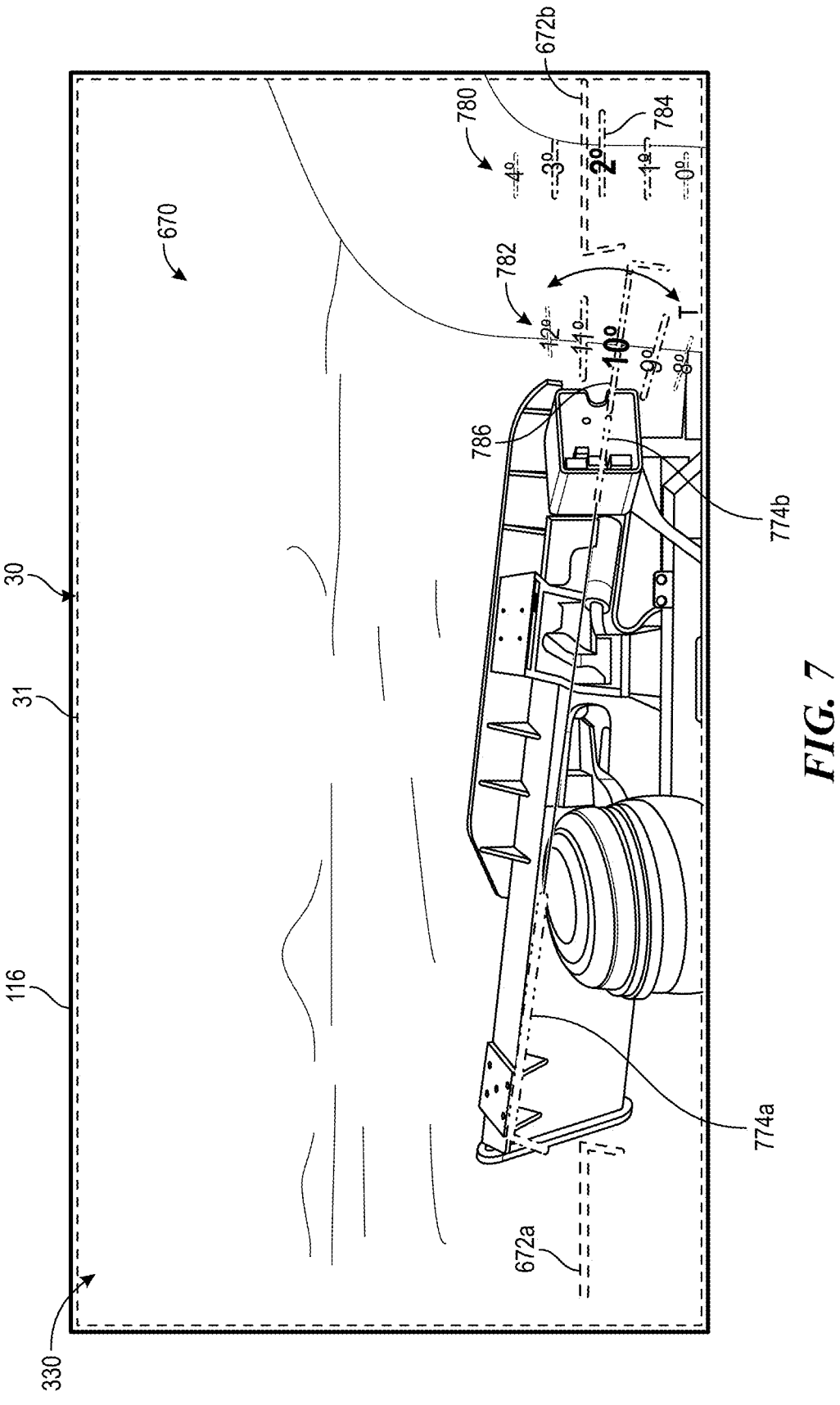

Referring to FIG. 7, the control interface 330 can further include a tool pitch indicator 780 and/or a tool roll or tilt indicator 782 ("tool tilt indicator 782"). The tool pitch indicator 780 can include at least some aspects that are generally similar or identical in structure and/or function to the machine pitch indicator 560 of FIG. 5. The tool pitch indicator 780 can include one or more pitch value indicators 784, individual ones of which can be aligned (e.g., lengthwise) with the tool height indicator 774*a-b* and configured to rotate with the tool height indicator 774*-b* (e.g., in response to tilt of the work tool). In the illustrated embodiment, the tool pitch indicator 780 is positioned to the right of the right tool height indicator 774*b* and the tool tilt indicator 782, and is configured to move up and/or down in concert with the tool height indicator 774*a-b*. In other embodiments, the tool pitch indicator 780 can have another suitable position (e.g., top left corner, off-center, etc.) and/or may have a fixed position.

The tool tilt indicator 782 can include at least some aspects that are generally similar or identical in structure and/or function to the machine roll indicator 550 of FIG. 5. The tool tilt indicator 782 can include one or more tilt value indicators 786. In the illustrated embodiment, the labeled tilt value indicator 786 is aligned with the right work tool height indicator 774*b*; in some aspects, the tilt value indicator 786 that is aligned with the work tool height indicator 774*a-b* can indicate the current tilt value of the work tool. The tool tilt indictor 782 can be configured to move and/or rotate in concert the work tool height indicator 774*a-b*, e.g., relative to the center of the work tool height indicator 774*a-b* and/or the work tool, as indicated by arrow T, to track or follow movement (e.g., tilt) of the work tool. In the illustrated embodiment, the tool pitch indicator 780 is aligned with the right tool height indicator 774*b*. In other embodiments, tool pitch indicator 780 can be aligned with the left tool height indicator 774*a*, may have a fixed position on the display 116, or may have another suitable position (e.g., top left corner, off-center, etc.). One or both of tool pitch indicator 780 and the tool tilt indicator 782 can be associated with a corresponding operating threshold, e.g., a tool pitch threshold and/or a tool roll/tilt threshold, and can be configured to change (e.g., visually change) when the current value is at or near the associated threshold value, generally similar to or the same as the machine pitch threshold described previously regarding FIG. 5.

Figure 8:
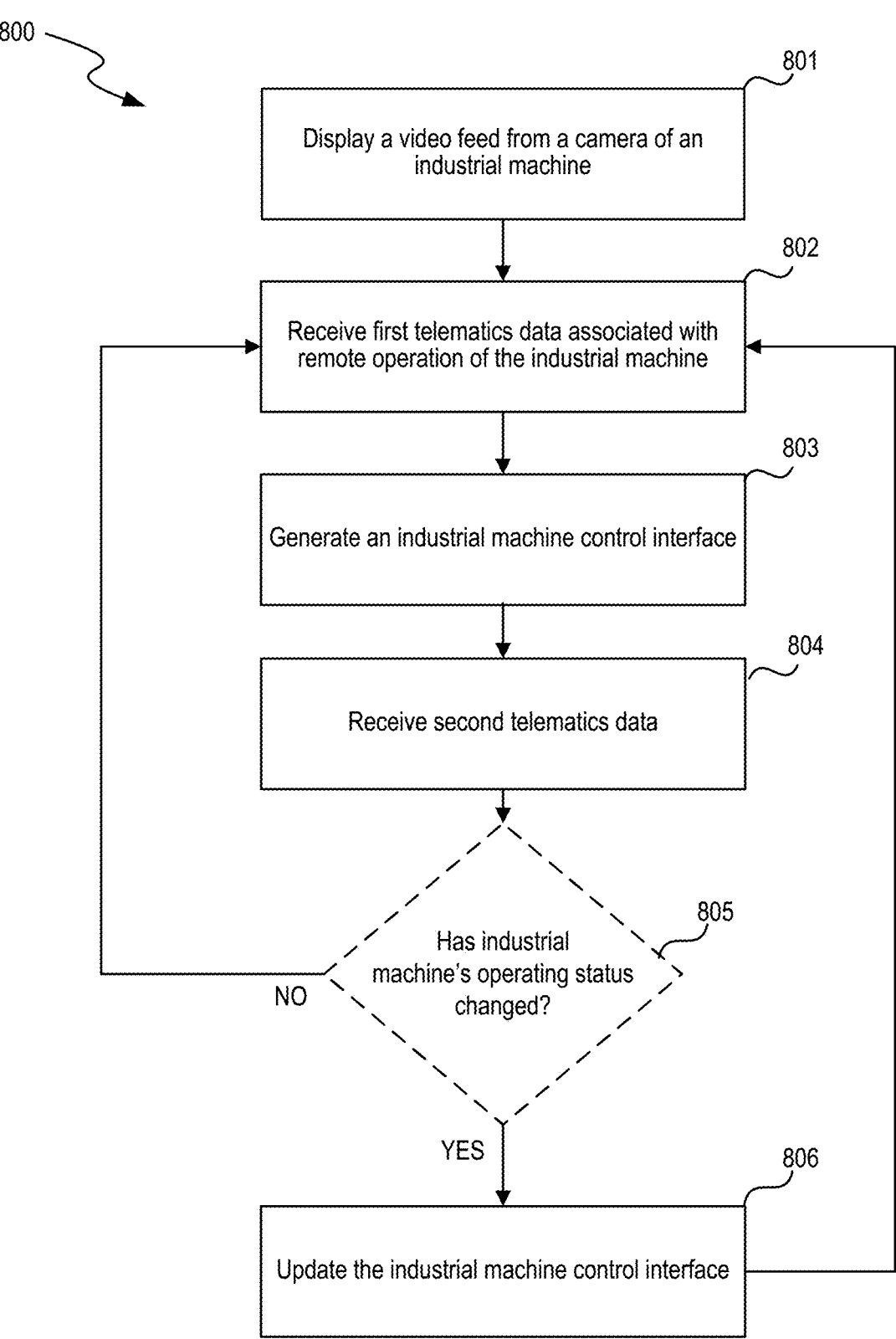
FIG. 8 is a flow diagram illustrating a method for remote operation of a machine in accordance with embodiments of the present technology.

FIG. 8 is a flow diagram illustrating a method 800 for remotely operating a machine in accordance with embodiments of the present technology. The method 800 is illustrated as a set of blocks, steps, operations, or processes 801-806. Several of the blocks 801-806 are described with reference to FIGS. 1-8. All or a subset of the blocks 801-806 can be executed at least in part by various components of a remote control station, such as the remote control station 110 of FIG. 1, the device 900 of FIG. 9, at least a portion of the environment 1000 of FIG. 10, at least one of the elements 1100 of FIG. 1, and/or any other suitable device and/or system. Additionally, or alternatively, all or a subset of the blocks 801-806 can be executed at least in part by an operator (e.g., a remote operator, a human operator, etc.) of the device and/or system. Furthermore, any one or more of the blocks 801-806 can be executed in accordance with the discussion herein.

The method 800 begins at block 801 by displaying a video feed from a camera of a machine. The video feed can include one or more of the video feeds 31-34 described previously with reference to FIGS. 4 and 6A-7, and/or any other suitable video feed. In at least some embodiments, for example, displaying a video feed can include displaying a plurality of video feeds, each associated with a different side of the machine. The camera can include one or more of the cameras 205*a-d* of FIG. 2C, and/or any other suitable camera. The machine can include an industrial machine, the machine 100 of FIG. 1, the machine 200 of FIGS. 2A-4 and 5-7, or any other suitable machine.

At block 802, the method 800 continues by receiving/collecting first telematics data associated with remote operation of the machine. Receiving/collecting the first telematics data can include receiving/collecting the first telematics data via one or more sensors of the machine. The one or more sensors can include one or more of the sensors 104 of FIG. 1, or any other suitable sensor(s). In at least some embodiments, for example, the first telematics data can include data associated with movement of a work tool of the machine, an orientation of the work tool relative to one or more work tool axes (e.g., the work tool pitch $P_{WT}$, roll $R_{WT}$, and/or yaw $Y_{WT}$ axes of FIG. 2B), an orientation of the machine and/or a portion thereof relative to one or more of machine axes (e.g., the machine pitch $P_M$, roll $R_M$, and/or yaw $Y_M$ axes of FIG. 2A), a speed at which the machine is traveling, a direction in which the machine is traveling, and/or any other suitable telematics data associated with remote operation of the machine.

At block 803, the method 800 continues by generating a control interface. The control interface can be associated with the remote operation of the machine. The control interface can be generally similar in structure and/or function to the control interface 330 of FIGS. 3A-7, and can include individual ones of the machine forward path indicators 332*a-b*, the machine reverse path indicators 334*a-b*, the drive component path indicators 336*a-b*, the drive component indicators 338*a-b*, the machine side reference indicators 340*a-b*, the machine side offset indicators 342*a-b*, the machine roll indicators 550*a-b*, the machine pitch indicators 560*a-b*, the machine reference indicators 551*a-b*, the work tool indicators 670, the ground reference indicators 672*a-b*, and the tool height indicators 674*a-b*, the single tool height indicator 676, the tool pitch indicator 780, the tool roll or tilt indicator 782, and/or any other suitable control interface elements associated with remote operation of the machine. In some embodiments, generating the control interface includes generating the control interface based at least partially on the first telematics data (block 802). In these and other embodiments, generating the control interface can include displaying individual elements of the control interface on the display of the video feed (block 801) and/or aligning the individual elements of the control interface on the displayed video feed with at least a portion of the machine. For example, as described previously with reference to FIG. 4, the left machine forward path indicator 332*a* can be coplanar with an outer edge of the machine's 200 left front tire but shown projected onto the machine plane M and/or the ground G (FIG. 2A), such that, in the plane of the display 116, the left machine forward path indicator 332a appears inwardly from the outer edge of the left front tire.

At block 804, the method 800 continues by receiving/collecting second telematics data associated with the remote operation of the machine. The second telematics data can be generally similar to or the same as the first telematics data (block 802), and can include data associated with the same or different components as the first telematics data. Accordingly, receiving/collecting the second telematics data can be generally similar to or the same as receiving/collecting the first telematics data (block 802). In some embodiments, the first telematics data is received/collected at a first time and the second telematics data is collected at a second time different than (e.g., after) the first time. In some embodiments, the first telematics data can be received/collected from individual ones of the machine's components at a first time, and the second telematics data can be received/collected for the individual ones of the machine's components at the second time, such that the first and second telematics data can correspond to the operation of the individual ones of the machine's component at least between the first time and the second time.

At block 805, the method 800 continues by determining whether the machine's operating status has changed. In some embodiments, the machine's operating status can change when one or more of the machine's components (e.g., one or more components associated with the control interfaces, block 803) have been moved, rotated, adjust, etc., by the remote operator. For example, the machine's operating status can change when the front 201a of the machine 200 is articulated relative to the back 201b for the machine, as described above regarding FIGS. 3A and 3B. As another example, the machine's operating status can change based on the speed at which the machine 200 is moving, as described above regarding FIG. 3C. As a further example, the machine's operating status can change in response to the pitch and/or roll of the machine, as described above regarding FIG. 5. As yet another example, the machine's operating status can change when the work tool 202 is moved, raised, rotated, pitch, rolled/tiled, etc., as described above regarding FIGS. 6A-7. In these and other embodiments, the machine's operating status can change when the second telematics data associated with a given component is different than the first telematics data associated with the given component. Accordingly, determining whether the machine's operating status has changed can be based at least partially on the first telematics data (block 802) and/or the second telematics data (block 804). In some embodiments, for example, determining whether the machine's operating status has changed can including identifying one or more changes in the second telematics data compared to the first telematics data, for example, to indicate whether individual ones of the machine's components have been moved, rotated, adjusted, etc., as described previously. In these and other embodiments, determining whether the machine's operating status has change can include determining whether the machine and/or one or more components thereof are operating at or near an operating threshold. The operating threshold can include the machine pitch threshold (FIG. 5), the machine roll threshold (FIG. 5), the work tool pitch threshold (FIG. 7), the work tool roll/tilt threshold (FIG. 7), and/or any other suitable operating threshold.

If, at block 805, it is determined that the machine's operating status has not changed (block 805—"NO"), the method can return to block 802 and repeat one or more of the blocks 802-805. If, at block 805, it is determined that the machine's operating status has changed (block 805—"YES"), the method can continue to block 806.

At block 806, the method 800 continues by updating the control interface (block 803). In some embodiments, updating the control interface can include updating the control interface based at least partially on the second telematics data (block 804). Updating the control interface can include moving, repositioning, rotating, pivoting, etc., one or more elements of the control interface, as described in detail regarding FIGS. 3A-7. Additionally, or alternatively, updating the control interface can include changing an appearance of one or more elements and/or portions thereof of the control interface based on an associated operating threshold (block 805). Changing the appearance of one or more of the elements and/or the portions thereof of can include changing a size, color, brightness, transparency, or any other visual characteristic, as described in detail regarding FIG. 5. In these and other embodiments, updating the control interface can include transitioning an element of the control interface from a first form to a second form. For example, referring to FIGS. 6A and 6B together, updating the control interface can include transitioning the work tool height indicator between the left and right work tool height indicators 674a-b (FIG. 6A) and the single work tool height indicator 676 (FIG. 6B) (e.g., based at least partially on data associated with a height of the work tool). In these and other embodiments, updating the control interface can include any other suitable update to the control interface and/or one or more elements thereof.

Although the steps of the method 800 are discussed and illustrated in a particular order, the method 800 illustrated in FIG. 8 is not so limited. A person of ordinary skill in the relevant art will recognize that the illustrated method 800 can be altered and still remain within these and other embodiments of the present technology. For example, one or more steps of the method 800 (e.g., block 805) illustrated in FIG. 8 can be omitted and/or repeated in some embodiments.

Although the steps of method 800 are discussed and illustrated in a particular order, the method 800 illustrated in FIG. 8 is not so limited. In other embodiments, method 800 can be performed in a different order. In these and other embodiments, any of the steps of method 800 can be performed before, during, and/or after any of the other steps of method 800. Moreover, a person of ordinary skill in the relevant art will recognize that the illustrated method 800 can be altered and still remain within these and other embodiments of the present technology. For example, one or more steps of the method 800 illustrated in FIG. 10 can be omitted and/or repeated in some embodiments.

The systems, devices, and/or methods of the present technology can be embodied as special purpose hardware (e.g., circuitry), as programmable circuitry appropriately programmed with software and/or firmware, or as a combination of special purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 9:
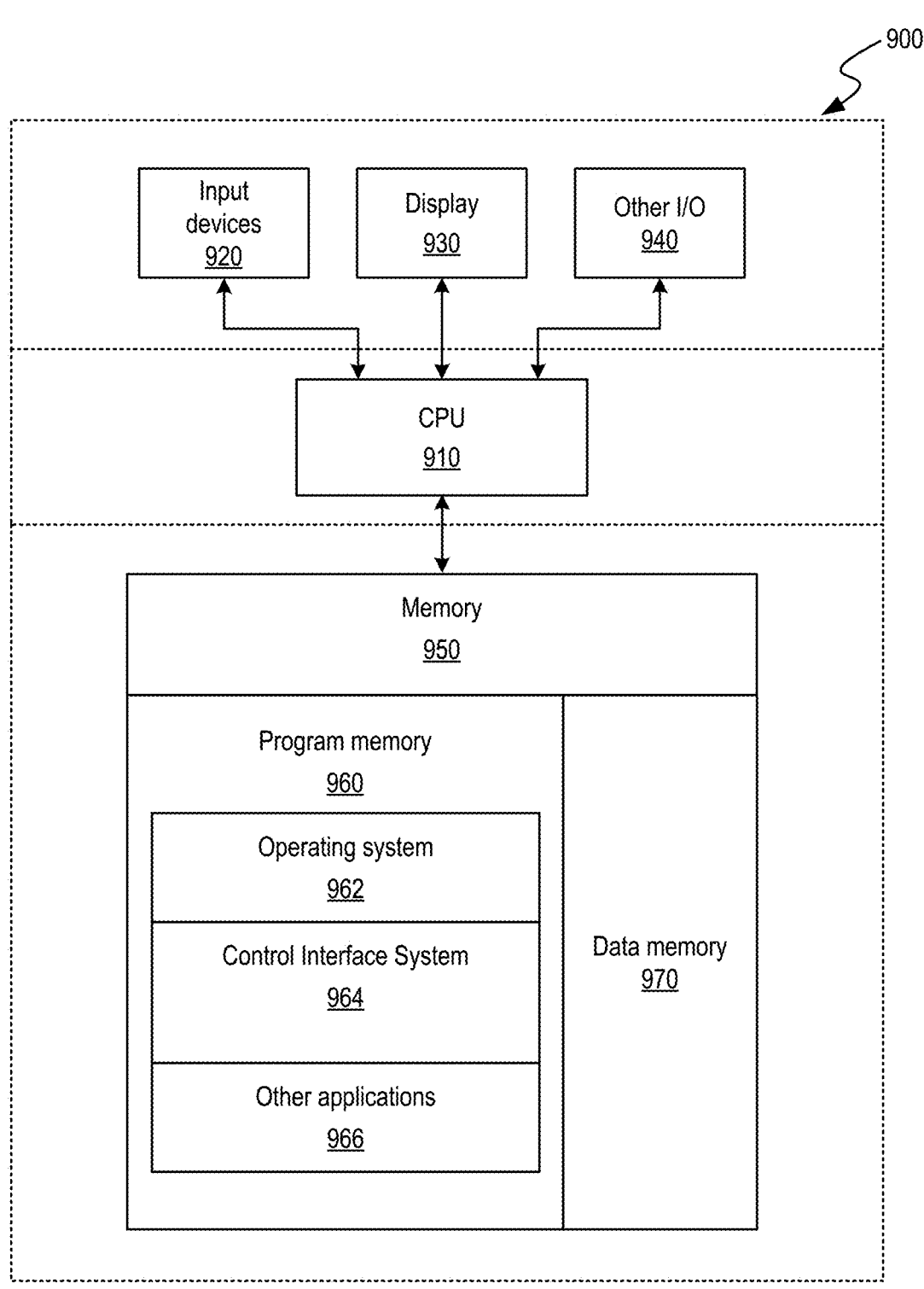
FIG. 9 is a block diagram illustrating an overview of devices on which embodiments of the present technology can operate.

Several implementations are discussed below in more detail in reference to the figures. FIG. 9 is a block diagram illustrating an overview of devices on which embodiments of the present technology can operate. The devices can comprise hardware components of a system or device 900 that generates one or more control interface elements for remote operation of a machine, for example. Device 900 can include one or more input devices 920 that provide input to the CPU (processor) 910, notifying it of actions. The actions are typically mediated by a hardware controller that interprets the signals received from the input device and communicates the information to the CPU 910 using a communication protocol. Input devices 920 include, for example, a mouse, a keyboard, a touchscreen, an infrared sensor, a touchpad, a wearable input device, a camera- or image-based input device, a microphone, or other operator input devices.

CPU 910 can be a single processing unit or multiple processing units in a device or distributed across multiple devices. CPU 910 can be coupled to other hardware devices, for example, with the use of a bus, such as a PCI bus or SCSI bus. The CPU 910 can communicate with a hardware controller for devices, such as for a display 930. Display 930 can be used to display text and graphics. In some examples, display 930 provides graphical and textual visual feedback to an operator. In some implementations, display 930 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other input/output (I/O) devices 940 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 900 also includes a communication device capable of communicating wirelessly or wire-based with a network node. The communication device can communicate with another device or a server through a network using, for example, TCP/IP protocols. Device 900 can utilize the communication device to distribute operations across multiple network devices.

The CPU 910 can have access to a memory 950. A memory includes one or more of various hardware devices for volatile and non-volatile storage, and can include both read-only and writable memory. For example, a memory can comprise RAM, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 950 can include program memory 960 that stores programs and software, such as an operating system 962, control interface system 964 (which may include instructions for generating control interface elements and/or carrying out the methods of machine remote operation), and other application programs 966. Memory 950 can also include data memory 970 that can include database information, etc., which can be provided to the program memory 960 or any element of the device 900.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 10:
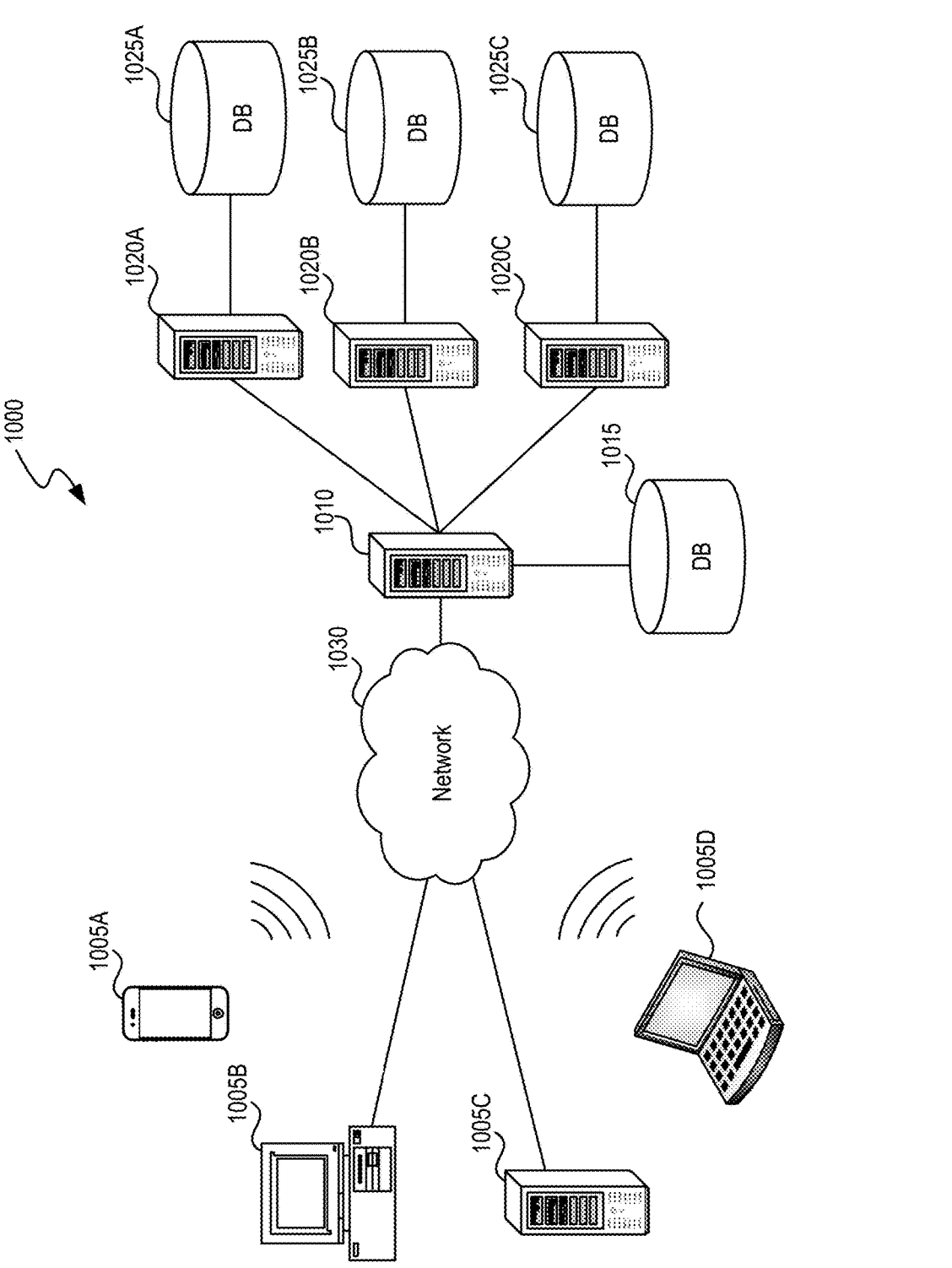
FIG. 10 is a block diagram illustrating an overview of an environment in which embodiments of the present technology can operate.

FIG. 10 is a block diagram illustrating an overview of an environment 1000 in which embodiments of the present technology can operate. Environment 1000 can include one or more client computing devices 1005A-D, examples of which can include device 900. Client computing devices 1005 can operate in a networked environment using logical connections through network 1030 to one or more remote computers, such as a server computing device 1010.

In some implementations, server computing device 1010 can be an edge server that receives client requests and coordinates fulfillment of those requests through other servers, such as servers 1020A-C. Server computing devices 1010 and 1020 can comprise computing systems, such as device 900. Though each server computing device 1010 and 1020 is displayed logically as a single server, server computing devices can each be a distributed computing environment encompassing multiple computing devices located at the same or at geographically disparate physical locations. In some implementations, each server computing device 1020 corresponds to a group of servers.

Client computing devices 1005 and server computing devices 1010 and 1020 can each act as a server or client to other server/client devices. Server 1010 can connect to a database 1015. Servers 1020A-C can each connect to a corresponding database 1025A-C. As discussed above, each server 1020 can correspond to a group of servers, and each of these servers can share a database or can have their own database. Databases 1015 and 1025 can warehouse (e.g., store) information. Though databases 1015 and 1025 are displayed logically as single units, databases 1015 and 1025 can each be a distributed computing environment encompassing multiple computing devices, can be located within their corresponding server, or can be located at the same or at geographically disparate physical locations.

Network 1030 can be a local area network (LAN) or a wide area network (WAN), but can also be other wired or wireless networks. Network 1030 may be the Internet or some other public or private network. Client computing devices 1005 can be connected to network 1030 through a network interface, such as by wired or wireless communication. While the connections between server 1010 and servers 1020 are shown as separate connections, these connections can be any kind of local, wide area, wired, or wireless network, including network 1030 or a separate public or private network.

FIG. 11 is a block diagram illustrating elements 1100 which can be used in a machine remote operation system, in accordance with embodiments of the present technology. The elements 1100 include hardware 1102, general software 1120, and specialized elements 1140. As discussed above, a system implementing the disclosed technology can use various hardware, including processing units 1104 (e.g., CPUs, GPUs, APUs, etc.), working memory 1106, storage memory 1108, and I/O devices 1110. Elements 1100 can be implemented in a client computing device, such as client computing devices 1005, or on a server computing device, such as server computing device 1010 or 1020.

General software 1120 can include various applications, including an operating system 1122, local programs 1124, and a basic input output system (BIOS) 1126. Specialized elements 1130 can be subcomponents of a general software application 1120, such as local programs 1124, which may include the control interface system 964 (see FIG. 9 and description above). Specialized elements 1130 can include a telematics data module 1132, a control interface element module 1134, a remote command module 1136, and/or components that can be used for transferring data and controlling the specialized components, such as interface 1138. In some implementations, elements 1100 can be in a computing system that is distributed across multiple computing devices or can be an interface to a server-based application executing one or more of specialized elements 1130.

B. INDUSTRIAL APPLICABILITY

In some embodiments, a machine remote operation system can include a telematics data module 1132, a control interface element module 1134, a remote command module 1136 (FIG. 7).

In operation, the telematics data module 1132 collects and stores the telematics data (see blocks 802, 804 in FIG. 8). The control interface element module 1134 can determine whether the machine's operating status has changed (see block 805), and generate a control interface (see block 802) and/or update the control interface (see block 806) based on the telematics data collected/stored by the telematics data module 1132. In at least some embodiments, the control interface element module 1134 can generate individual ones of the control interface elements 330 described herein. The remote command module 1136 can allow a remote operator to transmit command signals (e.g., command signals 40 of FIG. 1) to the machine, for example, based at least partially on the generated control interface generated by the control interface element module 1134.

The disclosed technology, therefore, provides a machine remote operation system, and can thereby increase the precision, accuracy, and/or safety with which a remote operator can remotely operate a machine. In particular, the control interface and/or elements thereof described herein are expected to increase the remote operator's awareness of the machine orientation and surrounding environment.

C. CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any materials incorporated herein by reference conflict with the present disclosure, the present disclosure controls. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and both A and B. Where the context permits, singular or plural terms can also include the plural or singular term, respectively. Additionally, the terms "comprising," "including," "having" and "with" are used throughout to mean including at least the recited feature(s) such that any greater number of the same feature and/or additional types of other features are not precluded.

Furthermore, as used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. Moreover, the terms "connect" and "couple" are used interchangeably herein and refer to both direct and indirect connections or couplings. For example, where the context permits, element A "connected" or "coupled" to element B can refer (i) to A directly "connected" or directly "coupled" to B, and/or (ii) to A indirectly "connected" or indirectly "coupled" to B.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while blocks are presented in a given order, alternative embodiments can perform blocks in a different order. As another example, various components of the technology can be further divided into subcomponents, and/or various components and/or functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. Rather, the embodiments are intended to cover all modifications, combinations, equivalents, and alternatives falling within the scope of this disclosure.

It should also be noted that other embodiments in addition to those disclosed herein are within the scope of the present technology. For example, embodiments of the present technology can have different configurations, components, and/or procedures in addition to those shown or described herein. Moreover, a person of ordinary skill in the art will understand that these and other embodiments can be without several of the configurations, components, and/or procedures shown or described herein without deviating from the present technology. Accordingly, the disclosure and associated technology can encompass other embodiments not expressly shown or described herein.

Reference in this specification to "one embodiment" or "an embodiment" means that a particular feature, structure, or characteristic described in connection with the embodiment is included in at least one embodiment of the disclosure. The appearances of the phrase "in one embodiment" (or the like) in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A method of improving an operator's operating environment awareness while remotely operating an industrial machine having a work tool, the method comprising:

displaying, via a display screen of a remote operating system, a video feed from a camera of the industrial machine;

receiving, at a first time and via the remote operating system, first telematics data associated with remote operation of the industrial machine;

generating, based at least partially on the first telematics data, an industrial machine control interface comprising a work tool indicator having a leading edge indicator, a right ground reference indicator, and a left ground reference indicator, wherein the work tool indicator is associated with (i) a height of the work tool and at least one of: (ii) a pitch angle of the work tool and a pitch direction of the work tool, or (iii) a roll angle of the work tool and a roll direction of the work tool;

displaying, over the video feed, the industrial machine control interface comprising the work tool indicator on the display screen;

receiving, at a second time and via the remote operating system, second telematics data associated with remote operation of the industrial machine, wherein the second telematics data is indicative of: (i) a change in the height of the work tool and at least one of: (ii) a change in the pitch angle of the work tool and the pitch direction of the work tool, or (iii) a change in the roll angle of the work tool and the roll direction of the work tool; and in response to determining, using the at least one of: (ii) the change in the pitch angle of the work tool and the pitch direction of the work tool, or (iii) the change in the roll angle of the work tool and the roll direction of the work tool, that the work tool is positioned at a pitch threshold, a roll threshold, or both, repositioning, using the second telematics data, the leading edge indicator on the display screen; and changing a visual characteristic of the repositioned leading edge indicator, the right ground reference indicator, or the left ground reference indicator on the display screen.

2. The method of claim 1 wherein:

the industrial machine control interface includes a machine roll indicator associated with a roll angle and a roll direction of the industrial machine, and the second telematics data includes a change to the roll angle and the roll direction of the industrial machine, the method further comprising:

updating the industrial machine control interface by rotating the machine roll indicator in the roll direction by the roll angle.

3. The method of claim 1 wherein:

the industrial machine control interface includes a machine pitch indicator associated with a pitch angle and a pitch direction of the industrial machine, and the second telematics data includes a change in the pitch angle and the pitch direction of the industrial machine, the method further comprising:

updating the industrial machine control interface by moving the machine pitch indicator in the pitch direction by a distance corresponding to the pitch angle.

4. The method of claim 1 wherein:

the industrial machine control interface includes a machine pitch indicator associated with a pitch angle and a pitch direction of the industrial machine, and a machine roll indicator associated with a roll angle and a roll direction of the industrial machine; and the second telematics data includes the pitch angle of the industrial machine and the pitch direction of the industrial machine, and the roll angle of the industrial machine and/or the roll direction of the industrial machine; and the method further comprises:

updating the industrial machine control interface by:

moving the machine pitch indicator in the pitch direction by a distance corresponding to the pitch angle, and rotating the machine roll indicator and the machine pitch indicator in the roll direction by the roll angle.

5. The method of claim 1 wherein the industrial machine control interface includes one or more of a machine roll indicator, or a machine pitch indicator.

6. The method of claim 1 wherein the industrial machine control interface includes at least one of: a machine pitch indicator, a machine roll indicator, a machine path indicator, a machine side reference indicator, or a machine drive element leading edge indicator.

7. The method of claim 1 wherein the visual characteristic includes at least one of an orientation, a size, a color, a brightness, a transparency, and/or a blinking pattern of a portion of the industrial machine control interface.

8. The method of claim 1, further comprising changing a size of a portion of the industrial machine control interface based at least partially on a speed at which the industrial machine is traveling.

9. The method of claim 1, further comprising generating and displaying on the display screen a numerical tool height value.

10. The method of claim 1, wherein the pitch threshold, the roll threshold, or both are operator-determined.

11. A system for improving an operator's operating environment awareness while remotely operating an industrial machine having a work tool, the system comprising:

a remote operating system including a display screen;

one or more processors; and one or more memory devices having stored thereon instructions that, when executed by the one or more processors, cause the one or more processors to:

display, via the display screen, a video feed from a camera of the industrial machine, receive, at a first time and via the remote operating system, first telematics data associated with remote operation of the industrial machine;

generate, based at least partially on the first telematics data, an industrial machine control interface comprising a work tool indicator having a leading edge indicator, a right ground reference indicator, and a left ground reference indicator, wherein the work tool indicator is associated with (i) a height of the work tool and at least one of: (ii) a pitch angle of the work tool and a pitch direction of the work tool, or (iii) a roll angle of the work tool and a roll direction of the work tool;

display the industrial machine control interface comprising the work tool indicator on the display screen;

receive, at a second time and via the remote operating system, second telematics data associated with remote operation of the industrial machine, wherein the second telematics data is indicative of: (i) a change in the height of the work tool and at least one of: (ii) a change in the pitch angle of the work tool and the pitch direction of the work tool, or (iii) a change in the roll angle of the work tool and the roll direction of the work tool; and in response to determining, using the at least one of: (ii) the change in the pitch angle of the work tool and the pitch direction of the work tool, or (iii) the change in the roll angle of the work tool and the roll direction of the work tool, that the work tool is positioned at a pitch threshold, a roll threshold, or both, reposition, using the second telematics data, the leading edge indicator on the display screen; and change a visual characteristic of the repositioned leading edge indicator, the right ground reference indicator, or the left ground reference indicator on the display screen.

12. The system of claim 11 wherein:

the industrial machine control interface includes a machine roll indicator associated with a roll angle and a roll direction of the industrial machine, the second telematics data includes a change to the roll angle and the roll direction of the industrial machine, and the one or more memory devices have stored thereon further instructions that, when executed by the one or more processors, cause the one or more processors to:

update the industrial machine control interface by rotating the machine roll indicator in the roll direction by the roll angle.

13. The system of claim 11 wherein:

the industrial machine control interface includes a machine pitch indicator associated with a pitch angle and a pitch direction of the industrial machine, and the second telematics data includes a change in the pitch angle and the pitch direction of the industrial machine, and the one or more memory devices have stored thereon further instructions that, when executed by the one or more processors, cause the one or more processors to:

update the industrial machine control interface by moving the machine pitch indicator in the pitch direction by a distance corresponding to the pitch angle.

14. The system of claim 11 wherein the instructions further cause the one or more processors to update the industrial machine control interface by changing a size of at least a portion of the industrial machine control interface based at least partially on a speed at which the industrial machine is traveling.

15. The system of claim 11 wherein the industrial machine control interface includes one or more of a machine roll indicator or a machine pitch indicator.

16. One or more non-transitory computer-readable media storing computer-executable instructions that, when executed by one or more processors, cause the one or more processors to perform operations comprising:

displaying, via a display screen of a remote operating system, a video feed from a camera of an industrial machine having a work tool;

receiving, at a first time and via the remote operating system, first telematics data associated with remote operation of the industrial machine;

generating, based at least partially on the first telematics data, an industrial machine control interface comprising a work tool indicator having a leading edge indicator, a right ground reference indicator, and a left ground reference indicator, wherein the work tool indicator is associated with (i) a height of the work tool and at least one of: (ii) a pitch angle of the work tool and a pitch direction of the work tool, or (iii) a roll angle of the work tool and a roll direction of the work tool;

displaying the industrial machine control interface comprising the work tool indicator on the display screen;

receiving, at a second time and via the remote operating system, second telematics data associated with remote operation of the industrial machine, wherein the second telematics data is indicative of: (i) a change in the height of the work tool and at least one of: (ii) a change in the pitch angle of the work tool and the pitch direction of the work tool, or (iii) a change in the roll angle of the work tool and the roll direction of the work tool; and in response to determining, using the at least one of: (ii) the change in the pitch angle of the work tool and the pitch direction of the work tool, or (iii) the change in the roll angle of the work tool and the roll direction of the work tool, that the work tool is positioned at a pitch threshold, a roll threshold, or both, repositioning, using the second telematics data, the leading edge indicator on the display screen; and changing a visual characteristic of the repositioned leading edge indicator, the right ground reference indicator, or the left ground reference indicator on the display screen.

17. The non-transitory computer-readable media of claim 16 wherein:

the industrial machine control interface includes a machine roll indicator associated with a roll angle and a roll direction of the industrial machine, the second telematics data includes a change to the roll angle and the roll direction of the industrial machine, and the computer-executable instructions, when executed by the one or more processors, cause the one or more processors to perform operations comprising updating the industrial machine control interface by rotating the machine roll indicator in the roll direction by the roll angle.

18. The non-transitory computer-readable media of claim 16 wherein:

the industrial machine control interface includes a machine pitch indicator associated with a pitch angle and a pitch direction of the industrial machine, and the second telematics data includes a change in the pitch angle and the pitch direction of the industrial machine, and the computer-executable instructions, when executed by the one or more processors, cause the one or more processors to perform operations comprising updating the industrial machine control interface by moving the machine pitch indicator in the pitch direction by a distance corresponding to the pitch angle.

19. The non-transitory computer-readable media of claim 16, the operations further comprising changing a size of the industrial machine control interface based at least partially on a speed at which the industrial machine is traveling.

20. The non-transitory computer-readable media of claim 16 wherein the industrial machine control interface includes one or more of a machine roll indicator or a machine pitch indicator.

* * * * *